United States Patent
Oohashi et al.

(10) Patent No.: US 8,843,340 B2
(45) Date of Patent: Sep. 23, 2014

(54) TRACK INFORMATION GENERATING DEVICE, TRACK INFORMATION GENERATING METHOD, AND COMPUTER-READABLE STORAGE MEDIUM

(75) Inventors: Yusuke Oohashi, Sapporo (JP); Daisuke Sakaki, Sapporo (JP); Yohei Ando, Okazaki (JP)

(73) Assignee: Aisin AW Co., Ltd., Anjo (JP)

(*) Notice: Subject to any disclaimer, the term of this patent is extended or adjusted under 35 U.S.C. 154(b) by 402 days.

(21) Appl. No.: 13/098,868

(22) Filed: May 2, 2011

(65) Prior Publication Data

US 2011/0320155 A1 Dec. 29, 2011

(30) Foreign Application Priority Data

Jun. 23, 2010 (JP) ................. 2010-142602
Jun. 23, 2010 (JP) ................. 2010-142604
Jun. 23, 2010 (JP) ................. 2010-142609

(51) Int. Cl.
*G01C 17/38* (2006.01)
*G01C 22/00* (2006.01)
*G01C 21/30* (2006.01)
*G01C 21/16* (2006.01)

(52) U.S. Cl.
CPC .............. *G01C 21/165* (2013.01); *G01C 21/30* (2013.01)
USPC ................. 702/95; 702/94; 702/150; 701/23; 701/26; 701/411; 701/468; 701/469

(58) Field of Classification Search
CPC ...... G01C 21/28; G01C 21/26; G01C 21/165; G01C 21/30
USPC .......... 702/94, 95, 150; 701/23.26, 411, 468, 701/469
See application file for complete search history.

(56) References Cited

U.S. PATENT DOCUMENTS

| | | | |
|---|---|---|---|
| 4,938,495 A | 7/1990 | Beasley et al. | |
| 5,383,127 A * | 1/1995 | Shibata | ........................ 701/446 |
| 5,390,125 A | 2/1995 | Sennott et al. | |
| 5,404,307 A | 4/1995 | Odagawa | |
| 5,424,953 A | 6/1995 | Masumoto et al. | |
| 5,469,158 A | 11/1995 | Morita | |

(Continued)

FOREIGN PATENT DOCUMENTS

| | | |
|---|---|---|
| CN | 1521056 A | 8/2004 |
| CN | 101303406 A | 11/2008 |

(Continued)

OTHER PUBLICATIONS

Nov. 2, 2011 European Search Report issued in EP 11 16 8050.

(Continued)

*Primary Examiner* — Janet Suglo
(74) *Attorney, Agent, or Firm* — Oliff PLC

(57) ABSTRACT

Track information generating devices, methods, and programs acquire a self-contained navigation track of a vehicle indicated by time-series pieces of self-contained navigation information, and acquire a GPS track of the vehicle indicated by time-series pieces of GPS information. The devices, methods, and programs compare the self-contained navigation track with the GPS track to correct the self-contained navigation information so as to reduce a difference between the self-contained navigation track and the GPS track.

4 Claims, 8 Drawing Sheets

(56) References Cited

U.S. PATENT DOCUMENTS

| | | | |
|---|---|---|---|
| 5,479,079 A | 12/1995 | Jeong et al. |
| 5,598,166 A | 1/1997 | Ishikawa et al. |
| 5,699,256 A | 12/1997 | Shibuya et al. |
| 5,757,317 A | 5/1998 | Buchler et al. |
| 5,991,525 A | 11/1999 | Shah et al. |
| 6,024,655 A | 2/2000 | Coffee |
| 6,029,111 A | 2/2000 | Croyle |
| 6,081,230 A | 6/2000 | Hoshino et al. |
| 6,253,154 B1 | 6/2001 | Oshizawa et al. |
| 6,282,496 B1 * | 8/2001 | Chowdhary ............... 701/446 |
| 6,317,688 B1 | 11/2001 | Bruckner et al. |
| 6,321,851 B1 | 11/2001 | Weiss et al. |
| 6,401,036 B1 | 6/2002 | Geier et al. |
| 6,434,462 B1 | 8/2002 | Bevly et al. |
| 6,570,534 B2 | 5/2003 | Cohen et al. |
| 6,581,695 B2 | 6/2003 | Bernhardt et al. |
| 6,615,135 B2 | 9/2003 | Davies |
| 6,658,353 B2 | 12/2003 | Shimizu et al. |
| 6,731,237 B2 | 5/2004 | Gustafson et al. |
| 6,804,587 B1 | 10/2004 | O Connor et al. |
| 6,826,478 B2 | 11/2004 | Riewe et al. |
| 6,895,313 B2 | 5/2005 | Imada et al. |
| 6,995,662 B2 | 2/2006 | Wortsmith |
| 7,200,490 B2 | 4/2007 | Lange et al. |
| 7,309,075 B2 | 12/2007 | Ramsey et al. |
| 7,383,114 B1 | 6/2008 | Lange et al. |
| 7,418,364 B1 | 8/2008 | Horton et al. |
| 7,437,230 B2 | 10/2008 | McClure et al. |
| 7,444,215 B2 | 10/2008 | Huang et al. |
| 7,502,678 B2 | 3/2009 | Diekhans et al. |
| 7,580,783 B2 | 8/2009 | Dix |
| 7,623,952 B2 | 11/2009 | Unruh et al. |
| 7,672,781 B2 | 3/2010 | Churchill et al. |
| 7,689,356 B2 | 3/2010 | Dix et al. |
| 7,715,979 B2 | 5/2010 | Dix |
| 7,844,378 B2 | 11/2010 | Lange |
| 7,904,226 B2 | 3/2011 | Dix |
| 8,095,250 B2 | 1/2012 | Hanson et al. |
| 8,112,201 B2 | 2/2012 | Aral |
| 8,145,390 B2 | 3/2012 | Dix et al. |
| 8,190,364 B2 | 5/2012 | Rekow |
| 8,209,075 B2 | 6/2012 | Senneff et al. |
| 8,447,518 B2 | 5/2013 | Tanino |
| 2002/0099481 A1 | 7/2002 | Mori |
| 2003/0187577 A1 | 10/2003 | McClure et al. |
| 2004/0181335 A1 | 9/2004 | Kim et al. |
| 2004/0182619 A1 | 9/2004 | McGregor et al. |
| 2004/0186644 A1 | 9/2004 | McClure et al. |
| 2005/0074143 A1 | 4/2005 | Kawai |
| 2008/0082225 A1 | 4/2008 | Barrett |
| 2008/0140253 A1 | 6/2008 | Brown |
| 2008/0195268 A1 | 8/2008 | Sapilewski et al. |
| 2008/0228353 A1 | 9/2008 | Mayfield et al. |
| 2008/0269956 A1 | 10/2008 | Dix et al. |
| 2009/0037041 A1 | 2/2009 | Senneff et al. |
| 2009/0099772 A1 | 4/2009 | Chiu et al. |
| 2009/0099774 A1 | 4/2009 | Takac et al. |
| 2009/0119016 A1 | 5/2009 | Tanino et al. |
| 2009/0236825 A1 | 9/2009 | Okuda et al. |
| 2009/0254275 A1 | 10/2009 | Xie et al. |
| 2009/0326763 A1 | 12/2009 | Rekow |
| 2010/0007550 A1 | 1/2010 | Nagamiya et al. |
| 2010/0084147 A1 | 4/2010 | Aral |
| 2010/0096203 A1 | 4/2010 | Freese, V et al. |

FOREIGN PATENT DOCUMENTS

| | | |
|---|---|---|
| CN | 101339036 A | 1/2009 |
| CN | 101363740 A | 2/2009 |
| EP | 1 096 230 A2 | 5/2001 |
| EP | 1 510 832 A1 | 3/2005 |
| JP | A-62-204317 | 9/1987 |
| JP | A-01-312409 | 12/1989 |
| JP | A-03-148009 | 6/1991 |
| JP | A-07-280575 | 10/1995 |
| JP | A-08-271607 | 10/1996 |
| JP | A-09-311045 | 12/1997 |
| JP | A-11-325925 | 11/1999 |
| JP | A-2000-298028 | 10/2000 |
| JP | A-2001-221652 | 8/2001 |
| JP | A-2003-279362 | 10/2003 |
| JP | A-2007-206010 | 8/2007 |
| JP | A-2008-032408 | 2/2008 |
| JP | A-2008-170278 | 7/2008 |
| JP | A-2008-175786 | 7/2008 |
| WO | WO 01/61271 A2 | 8/2001 |
| WO | WO 02/086533 A2 | 10/2002 |

OTHER PUBLICATIONS

Nov. 2, 2011 European Search Report issued in EP 11 16 8056.
Nov. 2, 2011 European Search Report issued in EP 11 16 8060.
May 31, 2012 Office Action issued in U.S. Appl. No. 13/098,860.
Nov. 18, 2013 Office Action issued in U.S. Appl. No. 13/098,860.
Japanese Patent Office, Notification of Reason(s) for Refusal mailed Jan. 7, 2014 in Japanese Patent Application No. 2010-142604 w/Partial English-language Translation.
Japanese Patent Office, Notification of Reason(s) for Refusal mailed Dec. 17, 2013 in Japanese Patent Application No. 2010-142609 w/Partial English-language Translation.
GPS, Railway Signalling & Communication, pp. 52-55, May 2007, vol. 43. No. 5 w/Abstract.

* cited by examiner

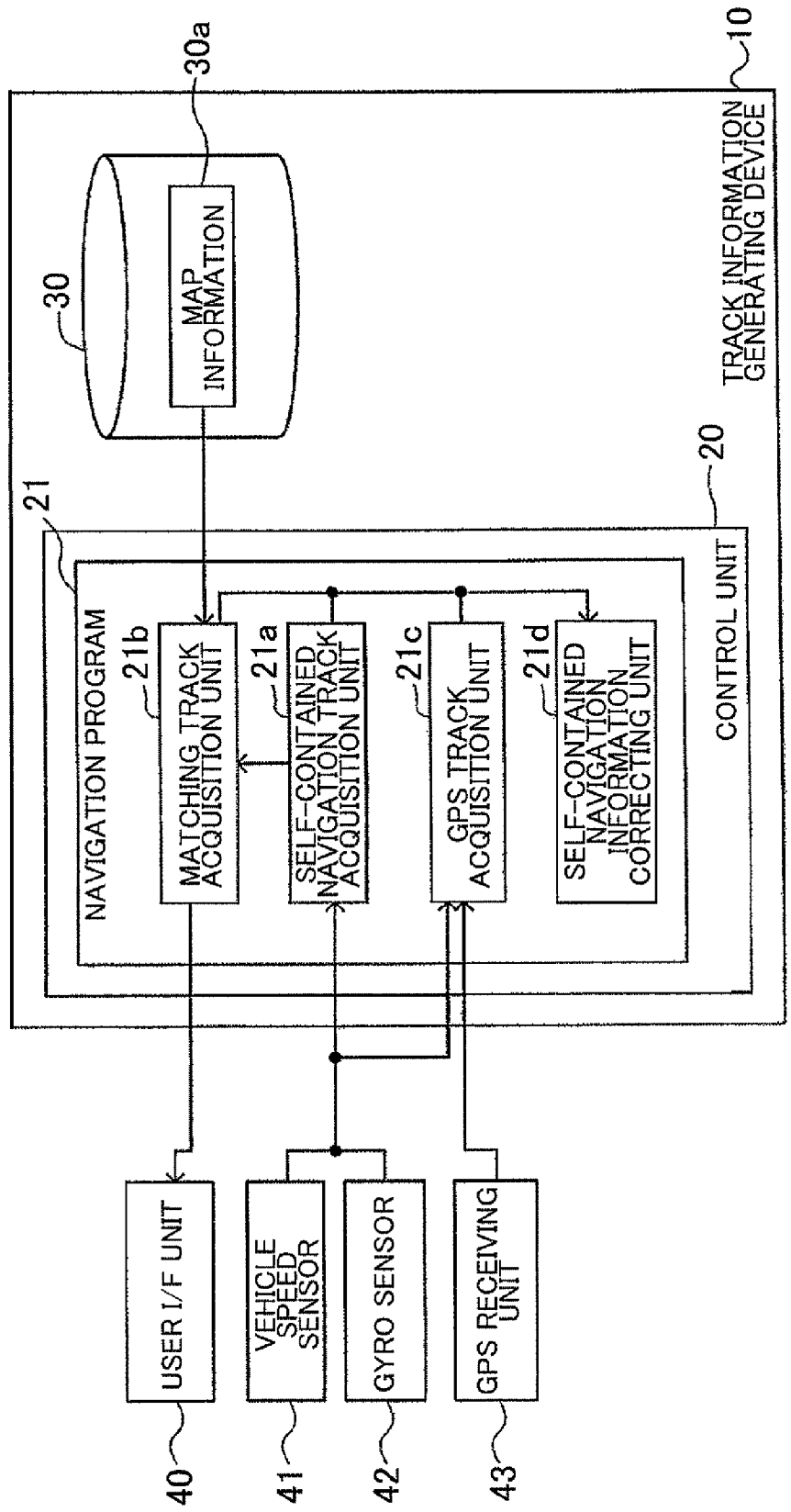

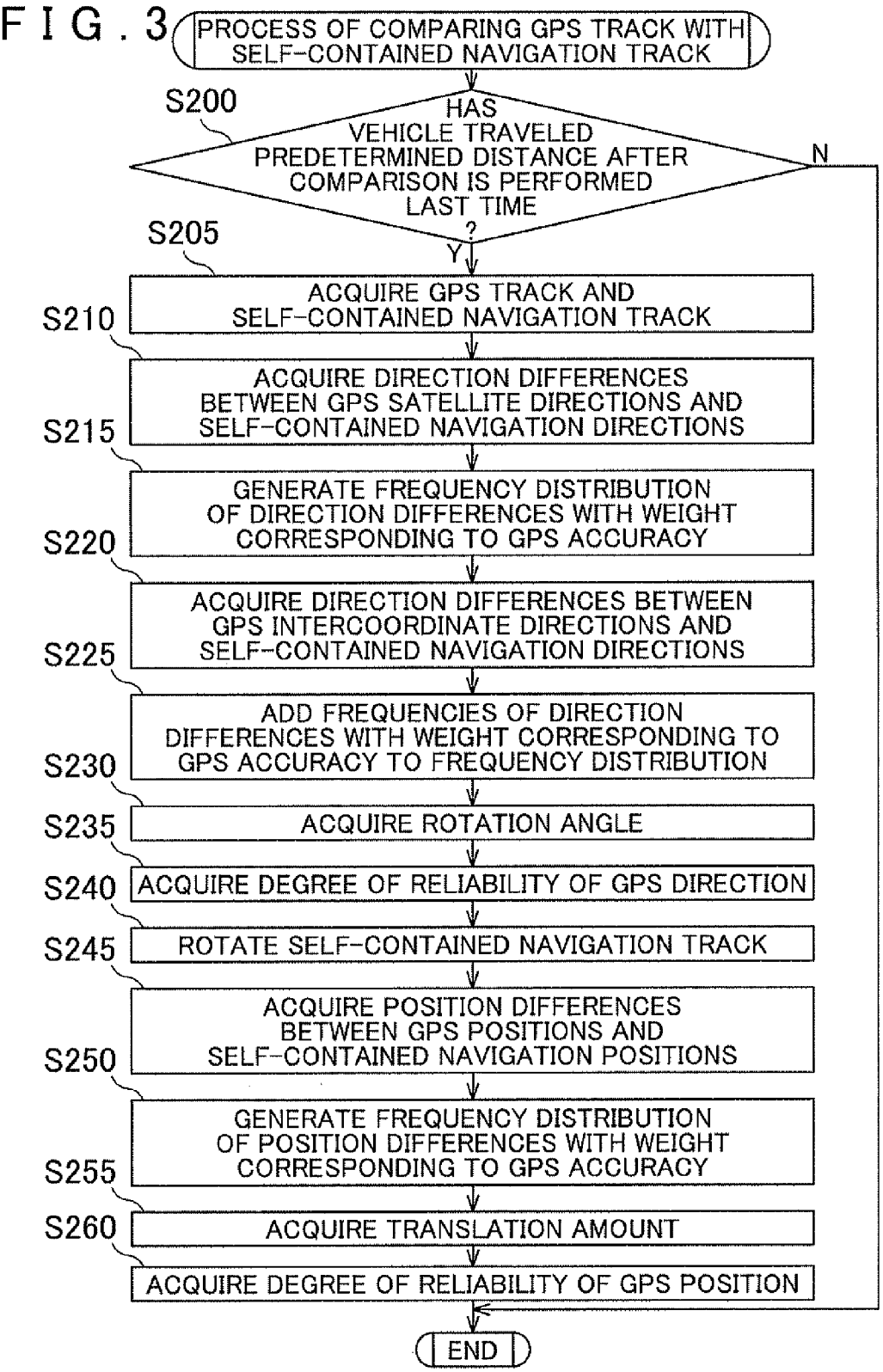

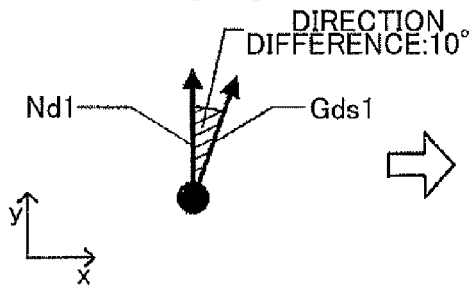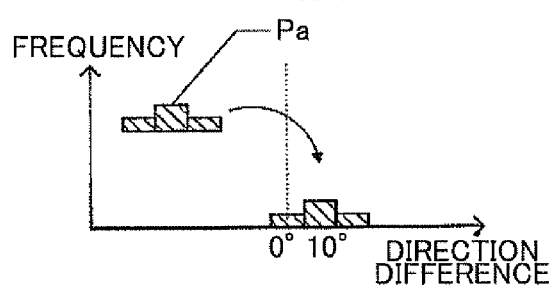
FIG. 5A  FIG. 5B
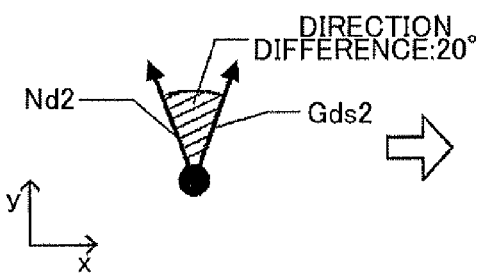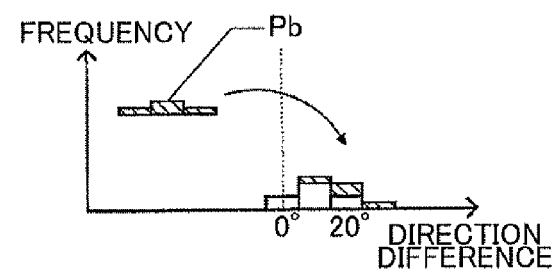
FIG. 6A  FIG. 6B
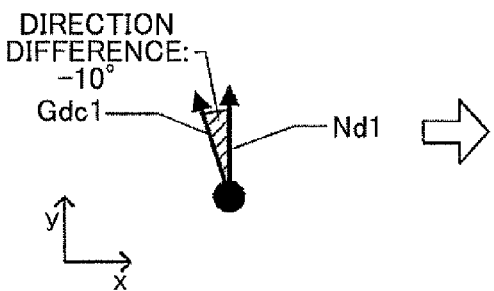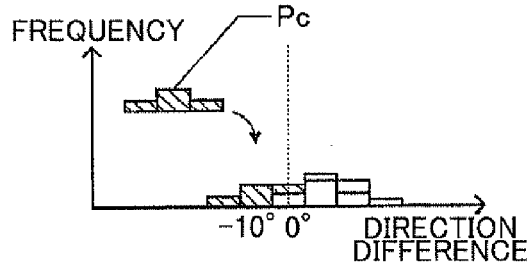
FIG. 7A  FIG. 7B
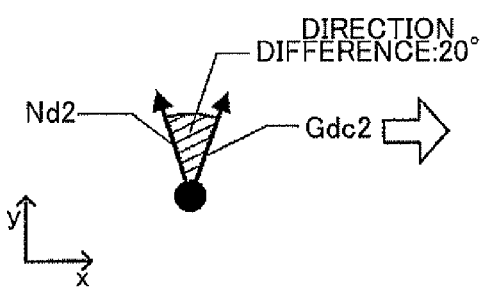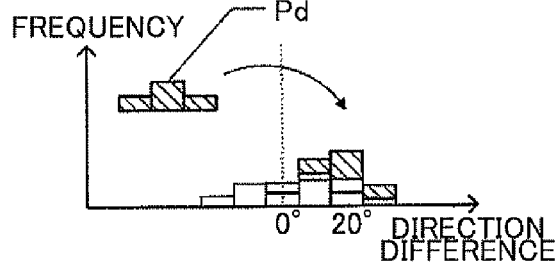
FIG. 8A  FIG. 8B

TRACK INFORMATION GENERATING DEVICE, TRACK INFORMATION GENERATING METHOD, AND COMPUTER-READABLE STORAGE MEDIUM

INCORPORATION BY REFERENCE

The disclosure of Japanese Patent Application No. 2010-142602 filed on Jun. 23, 2010 including the specification, drawings and abstract is incorporated herein by reference in its entirety.

BACKGROUND OF THE INVENTION

1. Field of the Invention

The present invention relates to a technique for generating track information that indicates the track of a vehicle.

2. Description of the Related Art

In an existing art, there is known a technique that acquires an estimated current position of a vehicle through self-contained navigation based on the results detected by a direction sensor and a distance sensor. For example, Japanese Patent Application Publication No. 2000-298028 (JP-A-2000-298028) describes a technique in which an estimated current position of a vehicle is acquired on the basis of the results detected by a direction sensor and a distance sensor, the estimated current position is compared with candidate positions on a road to determine the most probable candidate position on the road and then the estimated current position is corrected on the basis of the most probable candidate position on the road. In addition, JP-A-2000-298028 describes a technique for determining an error circle to narrow candidate positions on a road on the basis of an estimated current position and a position measured by a GPS.

SUMMARY OF INVENTION

A direction sensor and a distance sensor used for self-contained navigation as described in the existing technique respectively detect a direction difference from a reference direction and a distance from a reference position, so an estimated current position is inaccurate when the reference direction or the reference position is inaccurate. In addition, accumulated errors of each sensor increase over time, so an estimated current position is more inaccurate as the vehicle deviates from the reference direction and/or the reference position. Then, in the existing technique, a candidate position is set on a road on the basis of an estimated current position and then a correction is performed so that the candidate position is assumed as the estimated current position. However, the estimated current position acquired by the sensors contains an error, so the correction is not always right. Then, once an erroneous correction is performed, it is difficult to correct the estimated current position to a right current position because of pieces of information detected by the sensors are relative displacements from references, such as the reference direction.

The present invention provides a technique for improving the accuracy of a self-contained navigation track.

A first aspect of the present invention provides a track information generating device. The track information generating device includes: a self-contained navigation track acquisition unit that acquires a self-contained navigation track that is a track of a vehicle, indicated by time-series pieces of self-contained navigation information; a GPS track acquisition unit that acquires a GPS track that is a track of the vehicle, indicated by time-series pieces of GPS information; and a self-contained navigation information correcting unit that compares the self-contained navigation track with the GPS track to correct the self-contained navigation information so as to reduce a difference between the self-contained navigation track and the GPS track.

According to the first aspect, the self-contained navigation information is corrected so as to reduce the difference between the self-contained navigation track and the GPS track. By so doing, it is possible to avoid a situation that a position and a direction indicated by the self-contained navigation information totally differ from a true position and a true direction. In addition, it is possible to reduce accumulated errors of the self-contained navigation track, and thereby to suppress an increase in the accumulated errors over time. Thus, it is possible to improve the accuracy of the self-contained navigation track.

A second aspect of the invention provides a track information generating method. The track information generating method includes: acquiring a self-contained navigation track that is a track of a vehicle, indicated by time-series pieces of self-contained navigation information; acquiring a GPS track that is a track of the vehicle, indicated by time-series pieces of GPS information; and comparing the self-contained navigation track with the GPS track to correct the self-contained navigation information so as to reduce a difference between the self-contained navigation track and the GPS track.

A third aspect of the invention provides a computer-readable storage medium that stores computer-executable instructions for performing a track information generating method. The track information generating method includes: acquiring a self-contained navigation track that is a track of a vehicle, indicated by time-series pieces of self-contained navigation information; acquiring a GPS track that is a track of the vehicle, indicated by time-series pieces of GPS information; and comparing the self-contained navigation track with the GPS track to correct the self-contained navigation information so as to reduce a difference between the self-contained navigation track and the GPS track.

According to the above second and third aspects, as well as the first aspect, it is possible to improve the accuracy of the self-contained navigation track.

BRIEF DESCRIPTION OF DRAWINGS

The features, advantages, and technical and industrial significance of this invention will be described below with reference to the accompanying drawings, in which like numerals denote like elements, and wherein:

FIG. 1 is a block diagram of a track information generating device;

FIG. 3 is a flowchart that shows the process of comparing a GPS track with a self-contained navigation track;

FIG. 5A to FIG. 8B are views for illustrating a statistical process for determining direction differences and a representative value of the direction differences;

DETAILED DESCRIPTION OF EMBODIMENTS

Figure 2A:
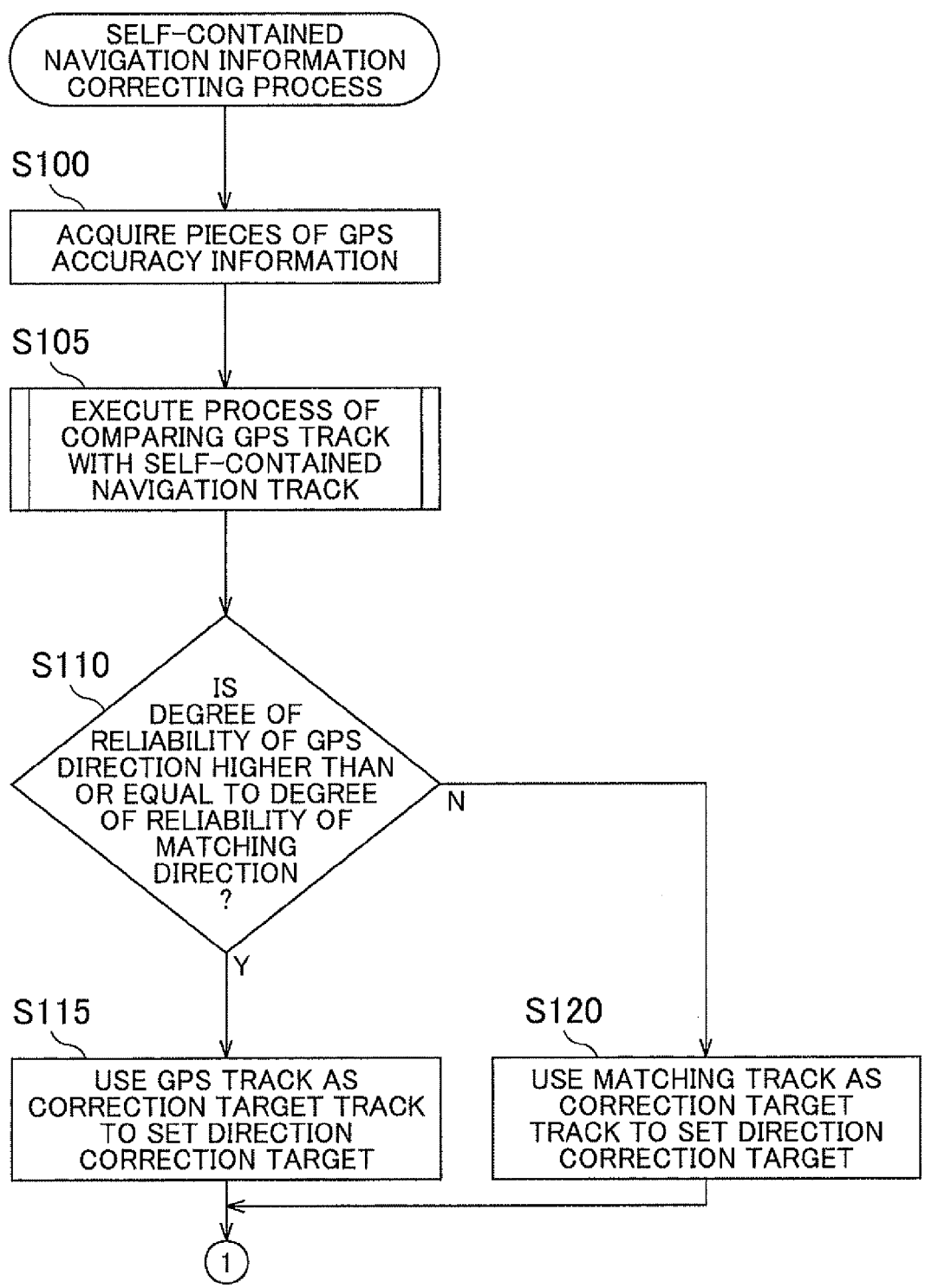
FIG. 2A and FIG. 2B are flowcharts that show a self-contained navigation information correcting process.

Here, embodiments of the invention will be described in accordance with the following sequence.
(1) Configuration of Track Information Generating Device
(2) Track Information Generating Process
(2-1) Map Matching Process
(2-2) Self-contained Navigation Information Correcting Process
(3) Alternative Embodiments
(1) Configuration of Track Information Generating Device FIG. 1 is a block diagram that shows the configuration of a track information generating device 10 according to an embodiment of the invention. The track information generating device 10 includes a control unit 20 and a storage medium 30. The control unit 20 includes a CPU, a RAM, a ROM, or the like. The control unit 20 executes programs stored in the storage medium 30 or the ROM. In the present embodiment, the control unit 20 executes a navigation program 21. The navigation program 21 has the function of determining the position of a vehicle on a road through map matching process on the basis of self-contained navigation information and then displaying the position of the vehicle on a map. In the present embodiment, the navigation program 21 executes track information generating process that generates track information indicating the track of the vehicle through a plurality of techniques and, particularly, has the function of generating a self-contained navigation track on the basis of the self-contained navigation information with high accuracy.

Map information 30a is recorded in the storage medium 30 in advance. The map information 30a is used to, for example, determine the position of the vehicle. The map information 30a includes node data, shape interpolation point data, link data, object data, and the like. The node data indicate the positions, or the like, of nodes set on roads on which the vehicle travels. The shape interpolation point data are used to determine the shape of a road between the nodes. The link data indicate a link between the nodes. The object data indicate the positions, types, and the like, of objects present on the roads or around the roads. Note that, in the present embodiment, the link data include information that indicates the width of the road corresponding to each link.

The vehicle equipped with the track information generating device 10 according to the present embodiment includes a user I/F unit 40, a vehicle speed sensor 41, a gyro sensor 42 and a GPS receiving unit 43. In addition, the navigation program 21 includes a self-contained navigation track acquisition unit 21a, a matching track acquisition unit 21b, a GPS track acquisition unit 21c and a self-contained navigation information correcting unit 21d. The navigation program 21 cooperates with the vehicle speed sensor 41, the gyro sensor 42 and the GPS receiving unit 43 to execute the function of generating a self-contained navigation track on the basis of pieces of self-contained navigation information with high accuracy.

The vehicle speed sensor 41 outputs a signal corresponding to the rotational speed of wheels equipped for the vehicle. The gyro sensor 42 outputs a signal corresponding to an angular velocity exerted on the vehicle. The self-contained navigation track acquisition unit 21a is a module that causes the control unit 20 to implement the function of acquiring a self-contained navigation track that is a track of the vehicle, indicated by time-series pieces of self-contained navigation information. That is, the control unit 20 operates the self-contained navigation track acquisition unit 21a to acquire the output signals of the vehicle speed sensor 41 and gyro sensor 42 via an interface (not shown) as self-contained navigation information.

Here, in the operation of the self-contained navigation track acquisition unit 21a, it is only necessary to acquire a self-contained navigation track, and, for example, it is only necessary to indirectly acquire time-series positions and directions of the vehicle in such a manner that the time-series output signals of the sensors equipped for the vehicle are acquired to detect the behavior of the vehicle and thereby determine the displacements in the relative position and direction with respect to a reference. The behavior of the vehicle to be detected may be various physical quantities of the vehicle. For example, it is conceivable that sensors that acquire a vehicle speed, an acceleration, an angular velocity, and the like, are equipped for the vehicle and a self-contained navigation track is acquired from signals output from the sensors.

Then, the control unit 20 determines the position displacement of the vehicle from the reference position on the basis of the output signal of the vehicle speed sensor 41 to determine the current position of the vehicle, and determines the direction displacement of the vehicle from the reference direction on the basis of the output signal of the gyro sensor 42 to determine the current direction of the vehicle. Note that, in this specification, the position of the vehicle, determined on the basis of the output signal of the vehicle speed sensor 41, is termed a self-contained navigation position, and the direction of the vehicle, determined on the basis of the output signal of the gyro sensor 42, is termed a self-contained navigation direction. Note that the above described reference position and reference direction just need to be the position of the vehicle and the direction (traveling direction) of the vehicle that are determined at predetermined time, and, for example, may be the position of the vehicle and the direction of the vehicle that are determined from GPS information (described later) at predetermined time. Furthermore, the control unit 20 determines self-contained navigation positions and self-contained navigation directions at multiple time points to determine pieces of information that indicate time-series self-contained navigation positions and time-series self-contained navigation directions, and then acquires the determined pieces of information as a self-contained navigation track.

The matching track acquisition unit 21b is a module that causes the control unit 20 to implement the function of executing map matching process in which a road of which the shape indicated by the map information 30a most coincides with the self-contained navigation track is assumed as a road on which the vehicle is traveling and then acquiring a matching track that is the time-series track of the vehicle, determined through the map matching process. That is, the control unit 20 consults the map information 30a to check the shapes of roads present around the vehicle against the self-contained navigation track. Then, the control unit 20 determines the road having the highest degree of coincidence between the shape of the road and the self-contained navigation track and then assumes the determined road as a road on which the vehicle is traveling to thereby determine the position and direction estimated as the position and direction of the vehicle on that road as the position and direction of the vehicle.

Note that, in this specification, the position of the vehicle, determined through the above described map matching process, is termed a matching position and the direction of the vehicle, determined through the map matching process, is termed a matching direction. Furthermore, the control unit 20 determines matching positions and matching directions at multiple time points to determine pieces of information that indicate time-series matching positions and matching directions, and then acquires the determined pieces of information as a matching track.

Then, the control unit 20 displays the matching position, the matching direction and the matching track on the user I/F unit 40. That is, the user I/F unit 40 is an interface unit for the user to input instructions or to provide various pieces of information to the user. The user I/F unit 40 has a display unit, a button, a speaker, or the like (not shown). In the present embodiment, the control unit 20 displays a map on the display unit of the user I/F unit 40, and displays icons indicating the matching position, the matching direction and the matching track on the map. Therefore, the control unit 20 generates image data that indicate the map and the icons indicating the matching position, the matching direction and the matching track, and outputs the image data to the user I/F unit 40. The user I/F unit 40 displays the map and the icons indicating the matching position, the matching direction and the matching track on the display unit on the basis of the image data.

Note that the control unit 20 operates the matching track acquisition unit 21b to determine the degree of reliability of each of the matching position and the matching direction that are determined through the map matching process. In the present embodiment, the control unit 20 determines the degree of reliability of the matching position on the basis of the width of the road on which the vehicle is assumed to be traveling, determined through the map matching process, and determines the degree of reliability of the matching direction on the basis of variations in the direction of the vehicle in process of executing the map matching process.

The GPS track acquisition unit 21c is a module that causes the control unit 20 to implement the function of acquiring a GPS track that is a track of the vehicle, indicated by time-series pieces of GPS information. That is, the control unit 20 operates the GPS track acquisition unit 21c to cause the GPS receiving unit 43 to acquire GPS information for calculating the current position and current direction of the vehicle to thereby determine the position and direction of the vehicle on the basis of the GPS information. Note that, in this specification, the position of the vehicle determined on the basis of the GPS information is termed a GPS position, and the direction of the vehicle determined on the basis of the GPS information is termed a GPS direction. The control unit 20 further determines GPS positions and GPS directions at multiple time points to determine pieces of information that indicate time-series GPS positions and time-series GPS directions, and then acquires the determined pieces of information as a GPS track. Note that GPS information in the present embodiment includes GPS accuracy information that indicates the accuracy of the GPS information.

The GPS track acquisition unit 21c just needs to be able to acquire a GPS track on the basis of time-series GPS information. Thus, the GPS track acquisition unit 21c just needs to be able to acquire signals from GPS satellites and then determine the current position and current direction of the vehicle in a prescribed coordinate system on the basis of the acquired signals. Note that the prescribed coordinate system may be a coordinate system consisting of latitude and longitude, a coordinate system consisting of longitude, latitude and altitude, or the like.

In the present embodiment, GPS accuracy information consists of an index acquired together GPS information and an index acquired on the basis of the state of the vehicle. That is, GPS information decreases in accuracy because of the relative relationship between the GPS satellites and the vehicle and the influence of a communication environment (degree of multipath, or the like). The GPS information includes an index (dilution of precision (DOP), such as horizontal dilution of precision (HDOP), the number of satellites placed in a state or position where high-accuracy positioning is possible, or the like) that indicates a decrease in accuracy. Then, in the present embodiment, the control unit 20 operates the GPS track acquisition unit 21c to acquire GPS accuracy information, included in the GPS information, together with the GPS information.

In addition, the accuracy of GPS information depends on the state of the vehicle, so, in the present embodiment, the control unit 20 also acquires an index that indicates the degree of decrease in the accuracy of GPS information due to the state of the vehicle. Specifically, the control unit 20 operates the GPS track acquisition unit 21c to acquire output information of the vehicle speed sensor 41 and output information of the gyro sensor 42 and then acquire an index, as GPS accuracy information, such that the accuracy of GPS information decreases as the speed of the vehicle decreases and the accuracy of GPS information decreases as the maximum variation in the direction of the vehicle in a predetermined period of time increases. Note that, in the present embodiment, GPS accuracy information is determined for each of a GPS position and a GPS direction, and the accuracy of a GPS position is determined on the basis of an accuracy index included in the GPS information. In addition, the accuracy of a GPS direction (GPS satellite direction described later) is determined on the basis of the accuracy index included in the GPS information and the degree of decrease in the accuracy of the GPS information due to the state of the vehicle. Note that, in the present embodiment, GPS accuracy information is normalized so that the highest accuracy is 100 and the lowest accuracy is 0 for each of a GPS position and a GPS direction.

As described above, the present embodiment is configured so that a matching position and a matching direction are acquired while checking a self-contained navigation track against a matching track to display the matching position, the matching direction and the matching track on the user I/F unit 40. Furthermore, in the present embodiment employs, in consideration of the respective characteristics of the self-contained navigation track, matching track and GPS track, the self-contained navigation track is corrected using the matching track or the GPS track.

The matching position and matching direction displayed on the user I/F unit 40 are a position and direction that are determined by checking the self-contained navigation track against the road shape. Therefore, when the self-contained navigation track is inaccurate, the matching position and the matching direction are also inaccurate. Specifically, in self-contained navigation, the position displacement of the vehicle from the reference position is determined on the basis of output information of the vehicle speed sensor 41 to determine a self-contained navigation position, and the direction displacement of the vehicle from the reference direction is determined on the basis of output information of the gyro sensor 42 to determine a self-contained navigation direction. That is, the self-contained navigation is a navigation to indirectly determine the position and direction of the vehicle within the prescribed coordinate system consisting of latitude, longitude, and the like, so the self-contained navigation cannot directly acquire a position in the prescribed coordinate system. Thus, when the reference position of the self-contained navigation position and the reference direction of the self-contained navigation direction are inaccurate, the position and direction of the self-contained navigation track are inaccurate, so a position and a direction that are totally different from a true position and a true direction may be detected as a matching position and a matching direction. In addition, self-contained navigation information contains an error due to the behavior, or the like, of the vehicle. An error of output information of the vehicle speed sensor 41 and an error of output information of the gyro sensor 42 accumulate over time, so the self-contained navigation position and the self-contained navigation direction decrease in accuracy over time. In this case as well, a position and a direction that are totally different from a true position and a true direction may be detected as a matching position and a matching direction.

On the other hand, GPS information directly indicates a position and a direction within the prescribed coordinate system consisting of latitude, longitude, and the like. Thus, even when the GPS information may contain an error, the latitude and longitude of the GPS information are reliable within an error range. Therefore, a position and a direction that are totally different from a true position and a true direction are not detected as GPS information. Then, when the self-contained navigation information is corrected so as to reduce the difference between the self-contained navigation track and the GPS track, it is possible to avoid a situation that a position and a direction that are indicated by the self-contained navigation information are totally different from a true position and a true direction.

Furthermore, GPS information directly indicates a position and a direction within the prescribed coordinate system; however, the GPS information not only depends on the relationship between the vehicle and GPS satellites but also receives the influence of multipath, and the like, so the GPS information is poor in regularity of error and can steeply change as compared with the self-contained navigation information. However, although it is less reliable to set one sample GPS information as a correction target, it is possible to statistically enhance the reliability of the position and direction with an increase in total frequency when time-series pieces of GPS information are collectively considered. Then, when a time-series self-contained navigation track is compared with a time-series GPS track and then the self-contained navigation information is corrected so as to reduce the difference between the self-contained navigation track and the GPS track, it is possible to reduce accumulated errors of the self-contained navigation track, and it is possible to suppress an increase in accumulated errors over time.

Furthermore, the node data, shape interpolation point data, and the like, included in the map information 30a indicate positions on actually present roads in latitude, longitude, and the like, so a matching position and a matching direction may be an actual position and an actual direction on a road. Thus, when the self-contained navigation information is corrected so as to reduce the difference between the self-contained navigation track and the matching track, the position and direction indicated by the self-contained navigation information may be corrected to at least an actually present position and an actually present direction.

In light of such characteristics of the tracks, in the present embodiment, the control unit 20 operates a self-contained navigation information correcting unit 21d to set one of the GPS track and the matching track, having a higher degree of reliability, as a correction target track and then to correct the self-contained navigation information so as to reduce the difference between the self-contained navigation track and the correction target track. That is, a GPS track and a matching track directly indicate positions and directions within the prescribed coordinate system, so the GPS track and the matching track can be a reference used to correct a self-contained navigation track that indirectly indicates positions and directions. Then, one of the GPS track and the matching track, having a higher degree of reliability, is selected as a correction reference of the self-contained navigation information. By so doing, it is possible to correct the self-contained navigation track with reference to information having a higher degree of reliability among pieces of information obtained in the vehicle. As a result, it is possible to effectively improve the accuracy of the self-contained navigation track. Note that, in the present embodiment, the matching track acquisition unit 21b is operated to acquire the degree of reliability of a matching track, and the self-contained navigation information correcting unit 21d is operated to acquire the degree of reliability of a GPS track. The details of these degrees of reliability will be described later.

Self-contained navigation information just needs to be corrected so as to reduce the difference between a self-contained navigation track and a correction target track. In the present embodiment, the control unit 20 rotates and translates a self-contained navigation track so as to obtain the highest degree of coincidence between the self-contained navigation track and a correction target track, sets a correction target of the self-contained navigation information on the basis of the rotated and translated track and then corrects the self-contained navigation information so as to reduce the difference from the correction target. Note that, when the correction target track is a matching track, the correction target set through the above rotation and translation is substantially equivalent to a matching position and a matching direction. That is, when the correction target track is a matching track, the position of the correction target is the matching position, and the direction of the correction target is the matching direction.

When the correction target track is a GPS track, the self-contained navigation track is rotated and translated so as to obtain the highest degree of coincidence between the self-contained navigation track and the GPS track. That is, the control unit 20 compares the self-contained navigation positions and self-contained navigation directions obtained through rotation and translation of the self-contained navigation track in a state where the shape of the self-contained navigation track is maintained with GPS positions and GPS directions, and then assumes the state where the differences between the multiple positions and the multiple directions are minimum as the state where the degree of coincidence is the highest. As a result, the rotation angle and translation amount of the self-contained navigation track compared with the GPS track are determined, and the control unit 20 assumes the result obtained by adding the rotation angle to the current self-contained navigation direction and adding the translation amount to the current self-contained navigation position as a correction target.

The control unit 20 operates the self-contained navigation information correcting unit 21d to correct the output information of the vehicle speed sensor 41 and the output information of the gyro sensor 42 so that the self-contained navigation position and the self-contained navigation direction approach the correction target determined as described above. Here, the self-contained navigation position and the self-contained navigation directions determined on the basis of the output information of the vehicle speed sensor 41 and the output information of the gyro sensor 42 just need to be corrected, and, of course, the reference position and the reference direction may be corrected instead. Note that, in the present embodiment, the self-contained navigation information correcting unit 21d repeatedly corrects the self-contained navigation position and the self-contained navigation direction so as to approach the correction target, and the self-contained navigation information correcting unit 21d is configured so that the self-contained navigation position and the self-contained navigation direction do not coincide with the correction target at the time of each correction.

That is, when a correction amount for correcting a self-contained navigation position and a self-contained navigation direction to coincide with a correction target is a first correction amount, the control unit 20 is configured to correct self-contained navigation information using a second correction amount that is smaller than the first correction amount. As described above, once a self-contained navigation track is corrected erroneously, it is difficult to recorrect the self-contained navigation position and/or the self-contained navigation direction. Then, in the present embodiment, the second correction amount that is smaller than the first correction amount is used to correct the self-contained navigation information to thereby suppress the influence of the correction even if an erroneous correction is performed. Thus, it is possible to easily improve the accuracy of the self-contained navigation track. Note that the second correction amount is smaller than the first correction amount and just needs to be set so as to achieve part of a correction achieved by the first correction amount.

(2) Track Information Generating Process

Figure 2B:
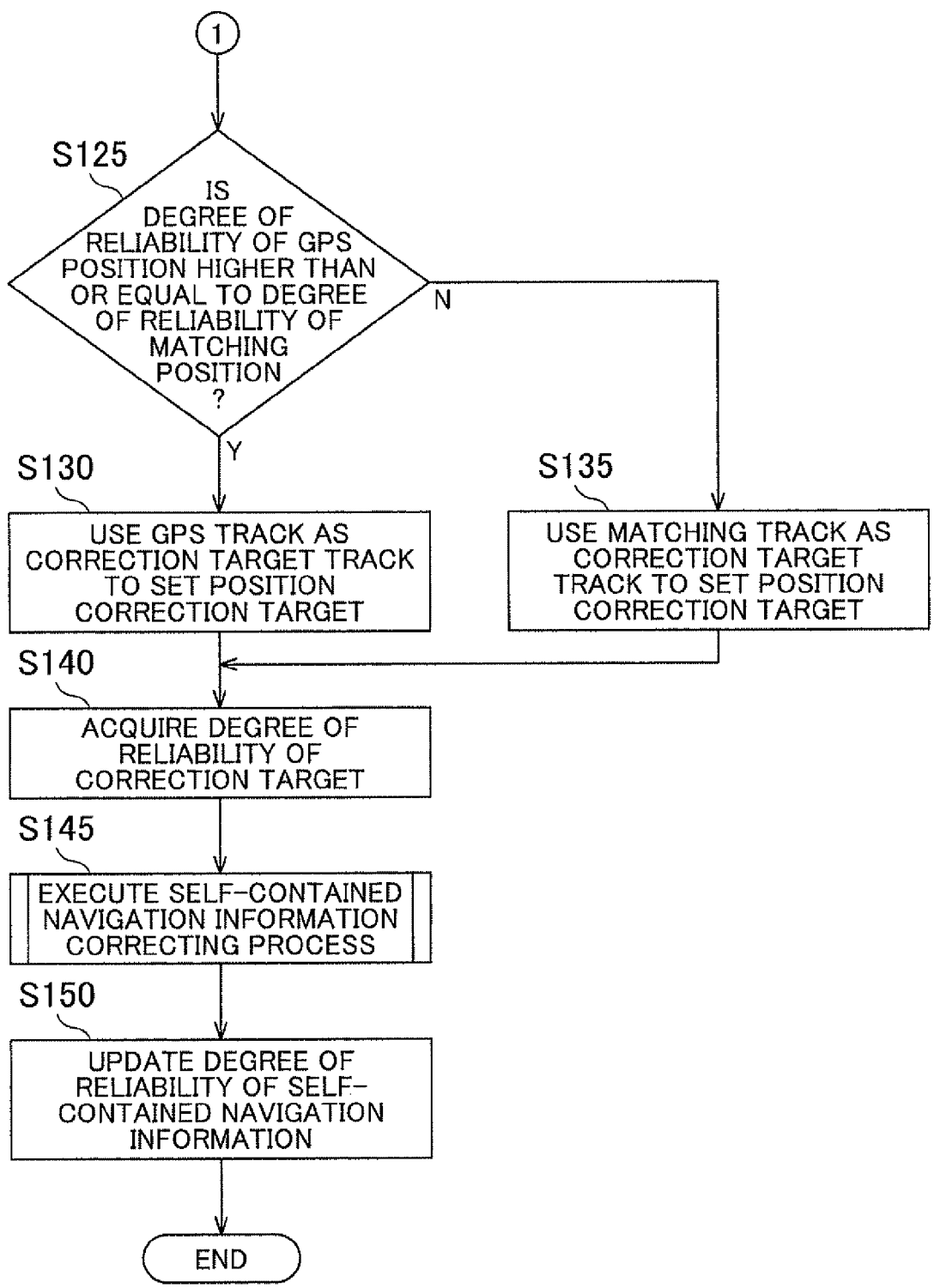

Next, track information generating process implemented by the navigation program 21 will be described. The track information generating process implemented by the navigation program 21 is executed at an interval of a predetermined period of time, and self-contained navigation information correcting process that improves the accuracy of a self-contained navigation track is executed in process of executing the above track information generating process. FIG. 2A and FIG. 2B are flowcharts that show the self-contained navigation information correcting process. On the other hand, the control unit 20 operates the matching track acquisition unit 21b at a predetermined period of time in parallel with the self-contained navigation information correcting process. Here, first, the map matching process will be described.

(2-1) Map Matching Process

In the map matching process, the control unit 20 operates the matching track acquisition unit 21b to acquire the map information 30a and a self-contained navigation track and then checks the map information 30a against the self-contained navigation track. That is, the control unit 20 operates the self-contained navigation information correcting unit 21d to acquire the output information of the vehicle speed sensor 41 and the output information of the gyro sensor 42 and then determine displacements in position and direction of the vehicle after these pieces of output information are acquired last time. Then, the control unit 20 determines a self-contained navigation position and a self-contained navigation direction on the basis of accumulated position displacements from the reference position and accumulated direction displacements from the reference direction, and sets time-series self-contained navigation positions and time-series self-contained navigation directions, which are determined within a predetermined period of time, as a self-contained navigation track. Note that the reference position and the reference direction may be updated over time; however, the initial value of the reference position and the initial value of the reference direction are determined on the basis of GPS information, or the like.

In addition, the control unit 20 consults the map information 30a to acquire link data, node data and shape interpolation point data that indicate the shapes of roads present within a predetermined range around the self-contained navigation position. Then, the control unit 20 checks the self-contained navigation track against the pieces of data acquired from the map information 30a to determine the road of which the shape most coincides with the self-contained navigation track.

Subsequently, the control unit 20 operates the matching track acquisition unit 21b to acquire a matching track. That is, the control unit 20 assumes the road, of which the shape most coincides with the self-contained navigation track, as a road on which the vehicle is traveling, and then rotates and translates the self-contained navigation track so that the shape of the road that is assumed as a road on which the vehicle is traveling most coincides with the self-contained navigation track. Then, the control unit 20 sets the position corresponding to the latest self-contained navigation position in the rotated and translated self-contained navigation track as a matching position, and sets the traveling direction of the vehicle at the matching position on the road as a matching direction. Furthermore, the control unit 20 acquires time-series matching positions and time-series matching directions, which are determined within a predetermined period of time, as a matching track.

Furthermore, the control unit 20 acquires the degree of reliability of the matching track. In the present embodiment, the degree of reliability of a matching position and the degree of reliability of a matching direction are acquired by different techniques. That is, the control unit 20 sets the degree of reliability of the matching position on the basis of the distance that the vehicle is assumed to be traveling on a continuous road and the width of the road on which the vehicle is assumed to be traveling. In the present embodiment, the accuracy of a matching position is defined in five levels as shown in the following Table 1. That is, when the distance that the vehicle is assumed to be traveling on a continuous road (matching continuous distance) is shorter than or equal to a predetermined distance Ts (m), the control unit 20 sets the degree of reliability of the matching position at 1. When the matching continuous distance is longer than the predetermined distance Ts, the control unit 20 sets the degree of reliability of the matching position at any one of 1 to 5. Then, in order to set the degree of reliability of the matching position in further details when the matching continuous distance is longer than the predetermined distance Ts, the control unit 20 consults the link data of the map information 30a to determine the width of the road that is assumed as a road on which the vehicle is traveling. Then, the control unit 20 sets the degree of reliability of the matching position at 5 when the road width is smaller than or equal to a predetermined threshold T4, and sets the degree of reliability of the matching position at 4 when the road width is larger than the predetermined threshold T4 and is smaller than or equal to a predetermined threshold T3. Further, the control unit 20 sets the degree of reliability of the matching position at 3 when the road width is larger than the predetermined threshold T3 and is smaller than or equal to a predetermined threshold T2, and sets the degree of reliability of the matching position at 2 when the road width is larger than the predetermined threshold T2 and is smaller than or equal to a predetermined threshold T1 The control unit 20 sets the degree of reliability of the matching position at 1 when the road width is larger than the predetermined threshold T1. That is, the control unit 20 increases the degree of reliability of the matching position as the width of the road that is assumed as a road on which the vehicle is traveling reduces.

TABLE 1

| MATCHING CONTINUOUS DISTANCE | ROAD WIDTH | DEGREE OF RELIABILITY OF POSITION |
|---|---|---|
| SHORTER THAN OR EQUAL TO Ts | — | 1 |
| LONGER THAN Ts | T4 OR BELOW | 5 |
| | T3 OR BELOW | 4 |

TABLE 1-continued

| MATCHING CONTINUOUS DISTANCE | ROAD WIDTH | DEGREE OF RELIABILITY OF POSITION |
|---|---|---|
| | T2 OR BELOW | 3 |
| | T1 OR BELOW | 2 |
| | OTHER THAN ABOVE | 1 |

Furthermore, the control unit 20 sets the degree of reliability of the matching direction on the basis of the distance that the vehicle is assumed to be traveling on a continuous road and the variation in the direction of the vehicle in process of executing the map matching process. In the present embodiment, the accuracy of a matching direction is defined in five levels. That is, the control unit 20 sets the degree of reliability of the matching direction at 1 when the distance that the vehicle is assumed to be traveling on a continuous road (matching continuous distance) is shorter than or equal to a predetermined distance Ts (m), and sets the degree of reliability of the matching direction at 2 or above when the matching distance is longer than the predetermined distance Ts. In order to set the degree of reliability of the matching direction in further details when the matching continuous distance is longer than the predetermined distance Ts, the control unit 20 determines a variation in the direction within a last predetermined period of time on the basis of the output information of the gyro sensor 42 within the last predetermined period of time. Then, the control unit 20 sets the degree of reliability of the matching direction at 3 when the variation in the direction is smaller than a predetermined threshold Td, and sets the degree of reliability of the matching direction at 2 when the variation in the direction is larger than or equal to the predetermined threshold Td. That is, the control unit 20 increases the degree of reliability of the matching direction as the variation in the direction in process of executing the map matching process reduces.

TABLE 2

| MATCHING CONTINUOUS DISTANCE | VARIATION IN DIRECTION WITHIN PREDETERMINED PERIOD OF TIME | DEGREE OF RELIABILITY OF DIRECTION |
|---|---|---|
| SHORTER THAN OR EQUAL TO Ts | — | 1 |
| LONGER THAN Ts | BELOW Td | 3 |
| | Td OR ABOVE | 2 |

In the present embodiment, as described above, the degree of reliability of a matching position and the degree of reliability of a matching direction are set by different techniques. However, in a specific case, the degree of reliability of a matching position and the degree of reliability of a matching direction are set by the same technique. That is, the degree of reliability of a matching position and the degree of reliability of a matching direction are respectively set on the basis of the above described Table 1 and Table 2 when the vehicle is traveling on a normal road; however, it is impossible to acquire GPS information in a tunnel, so a technique different from the method based on Table 1 and Table 2 is employed so that a matching track easily becomes a correction target track.

Specifically, when the vehicle is assumed to be traveling on a road in a tunnel, the control unit 20 operates the matching track acquisition unit 21b to determine the shapes of roads within a predetermined range around the vehicle by consulting the node data, shape interpolation point data and link data included in the map information 30a and to determine the degree of coincidence of the direction by checking directions at multiple positions on a road (traveling directions when the vehicle travels on a road) against time-series self-contained navigation positions. Then, the degree of reliability of a matching position and the degree of reliability of a matching direction are set so as to increase as the degree of coincidence of the direction increases. Note that the degree of coincidence of the direction may be determined using a variance of the direction, or the like. The above described degree of reliability of a matching position and the above described degree of reliability of a matching direction are respectively set each time the latest matching position and the latest matching direction are determined.

In addition, the above configuration is one example. The degree of reliability of a matching position and the degree of reliability of a matching direction may be set by analyzing the degree of coincidence of the position, and a similar process when the vehicle travels on a road in a tunnel may be executed in a parking lot in which GPS information cannot be acquired. Furthermore, the degree of reliability of a matching position and the degree of reliability of a matching direction are the degree of reliability of information obtained as a result of the map matching process, so the degree of reliability of a matching position and the degree of reliability of a matching direction may be decreased when the accuracy of the map matching process may decrease. For example, when it falls within a predetermined period of time after the vehicle starts traveling (the power is turned on) or there is another probable candidate road (for example, an acute branch road or a parallel road) within a predetermined distance around the road that is assumed as the road on which the vehicle is traveling, when the difference between the direction indicated by the output information of the gyro sensor 42 and the direction of a road is larger than or equal to a predetermined value or when the road that is assumed as the road on which the vehicle is traveling is situated in an attached facility of an expressway (service area, parking area, or the like), the degree of reliability of a matching position and the degree of reliability of a matching direction may be decreased or may be set to a certain lower value (degree of reliability is 1, or the like), for example.

(2-2) Self-Contained Navigation Information Correcting Process

In the self-contained navigation information correcting process shown in FIG. 2A and FIG. 2B, the control unit 20 operates the GPS track acquisition unit 21c to acquire pieces of GPS accuracy information (step S100). Subsequently, the control unit 20 executes the process of comparing a GPS track with a self-contained navigation track (step S105). The process of comparing a GPS track with a self-contained navigation track is a process of acquiring the degree of reliability of a GPS track and a first correction amount (rotation angle and translation amount) for obtaining the highest degree of coincidence between the self-contained navigation track and the GPS track, and is implemented by the flowchart shown in FIG. 3. In addition, FIG. 4A to FIG. 4C are views for illustrating rotation and translation of a self-contained navigation track in a coordinate system in which longitude is set to x-axis and latitude is set to y-axis.

Figure 4A:
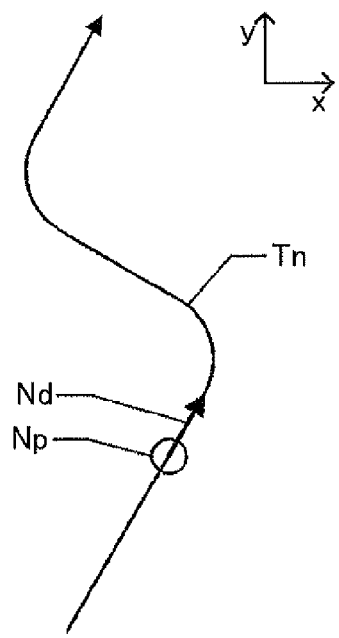
FIG. 4A to FIG. 4C are views for illustrating rotation and translation of the self-contained navigation track.

FIG. 4A shows an example of a self-contained navigation track Tn by the solid curved arrow. FIG. 4B shows an example of a GPS track by the solid circles and the arrows. That is, in FIG. 4B, each of the solid circles indicates a GPS position Gp, each of the solid straight arrows indicates a GPS satellite direction Gds at the corresponding GPS position Gp, and each of the broken straight arrows indicates a GPS intercoordinate direction Gdc between the adjacent GPS positions Gp. GPS information includes information indicating the direction of the vehicle; however, not the direction of the vehicle but the direction of an interposition vector of the vehicle may be assumed as the direction of the vehicle. Then, in the present embodiment, the direction of the vehicle included in GPS information is termed a GPS satellite direction, the direction of an interposition vector of the vehicle is termed a GPS interposition direction, and a GPS direction is evaluated on the basis of both the GPS satellite direction and the GPS interposition direction.

Note that, originally, a self-contained navigation track Tn is also formed of a plurality of self-contained navigation positions and a plurality of self-contained navigation directions; however, in the present embodiment, the sampling interval of self-contained navigation information is shorter than the sampling interval of GPS information, so FIG. 4A shows the self-contained navigation track Tn by the solid curved arrow and illustrates a self-contained navigation position Np and a self-contained navigation direction Nd at only one position. That is, in the self-contained navigation track Tn of FIG. 4A, the solid curved arrow indicates that any one of the positions on the curve is the self-contained navigation position, the direction indicated by the arrow at the distal end of the curved arrow is the latest self-contained navigation direction, and the tangent of the curved arrow at each self-contained navigation position indicates a self-contained navigation direction at that self-contained navigation position.

Figure 4B:
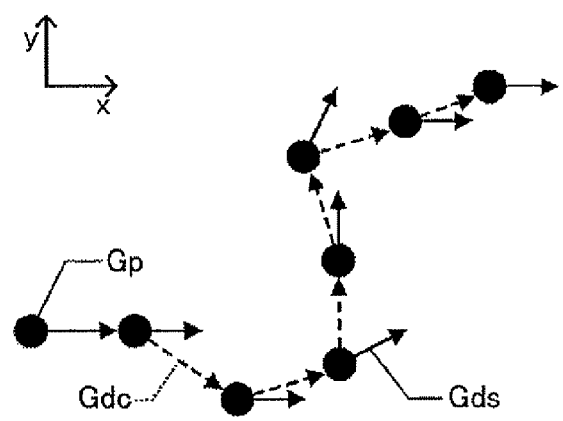
Figure 4C:
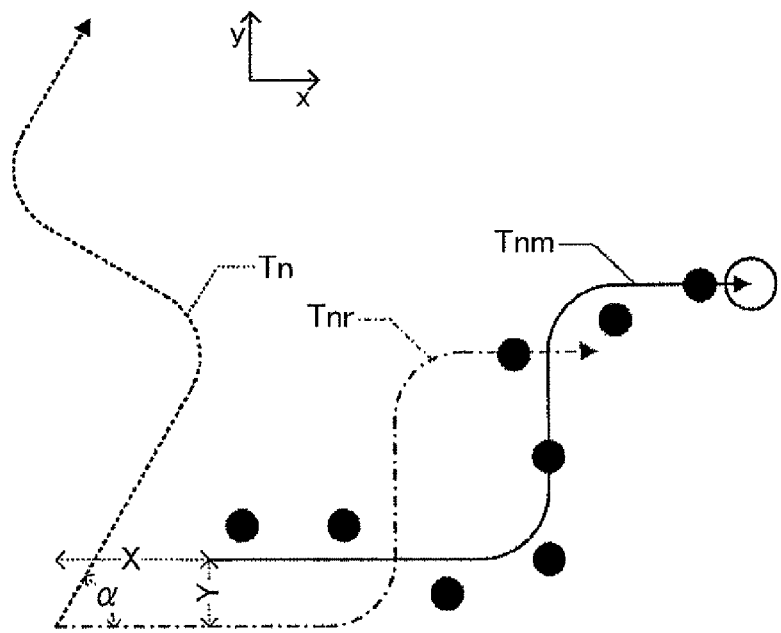

As shown in FIG. 4A and FIG. 4B, generally, the self-contained navigation track Tn is similar to the GPS track but is different from the GPS track. GPS information not only depends on the relationship between the vehicle and GPS satellites but also receives the influence of multipath, and the like, so the GPS information is poor in regularity of error and can steeply change as compared with self-contained navigation information. On the other hand, an error of the output information of the vehicle speed sensor 41 and an error of the output information of the gyro sensor 42 regularly occur as compared with an error of the GPS information, and the frequency of a steep variation in the output information of the vehicle speed sensor 41 and the frequency of a steep variation in the output information of the gyro sensor 42 are low. Thus, an error of the self-contained navigation information Tn accumulates over time; however, the degrees of reliability of pieces of output information that are output at adjacent times do not significantly differ from each other. Therefore, the shape of the self-contained navigation track Tn is more accurate than that of the GPS track. Then, the self-contained navigation track Tn is rotated and translated in a state where the shape of the self-contained navigation track Tn is maintained, and then the GPS track may be evaluated to have a higher degree of reliability as the GPS track has a higher degree of coincidence with self-contained navigation track Tn that is rotated and translated to have the highest degree of coincidence with the GPS track. In addition, when the degree of reliability of the GPS track is high and can be a correction target track, the self-contained navigation track Tn is rotated and translated in a state where the shape of the self-contained navigation track Tn is maintained, and then the rotation angle and the translation amount by which the degree of coincidence between the self-contained navigation track Tn and the GPS track is the highest may be respectively assumed as a first correction amount of the self-contained navigation direction and a first correction amount of the self-contained navigation position.

Then, in the present embodiment, the first correction amount of the self-contained navigation direction is statistically determined on the basis of GPS satellite directions and GPS intercoordinate directions, which correspond to a plurality of GPS positions, and self-contained navigation directions, which correspond to a plurality of self-contained navigation positions. That is, a representative value of the direction differences between a plurality of GPS satellite directions and a plurality of self-contained navigation directions and a representative value of the direction differences between a plurality of GPS intercoordinate directions and a plurality of self-contained navigation directions are assumed as the rotation angle of the self-contained navigation track Tn by which the degree of coincidence between the self-contained navigation track and the GPS track is the highest.

The pre-rotated self-contained navigation track Tn is actually formed of a plurality of self-contained navigation positions Np and a plurality of self-contained navigation directions Nd, so, when the direction difference (rotation angle) between the self-contained navigation direction Nd and the GPS direction (GPS satellite direction Gds and GPS intercoordinate direction Gdc) at the same time is determined, the rotation angle by which the self-contained navigation track Tn is rotated at that time to obtain the highest degree of coincidence between the GPS track and the self-contained navigation track Tn is determined. Thus, when a representative value of the direction differences between the self-contained navigation directions Nd and the GPS directions at multiple times is determined, the representative value may be assumed as the rotation angle by which the degree of coincidence between the GPS track and the self-contained navigation track Tn is the highest. In FIG. 4C, the broken curved arrow indicates the pre-rotated self-contained navigation track Tn, and the alternate long and short dashed curved arrow indicates a rotated self-contained navigation track Tnr. FIG. 4C shows a rotation angle $\alpha$ by which the degree of coincidence between the GPS track and the self-contained navigation track Tn is the highest.

Furthermore, in the present embodiment, the first correction amount of the self-contained navigation position is statistically determined on the basis of a plurality of GPS positions and a plurality of self-contained navigation positions. That is, a representative value of the position differences between the plurality of GPS positions and the plurality of self-contained navigation positions is assumed as the translation amount of the self-contained navigation track by which the degree of coincidence between the self-contained navigation track and the GPS track is the highest. For example, FIG. 4C shows the pre-translated self-contained navigation track Tnr by the broken curved arrow, and shows a translated self-contained navigation track Tnm by the solid curved arrow.

The pre-translated self-contained navigation track Tnr is a track obtained by rotating the self-contained navigation track by the above described rotation angle $\alpha$, and is formed of a plurality of rotated self-contained navigation positions and a plurality of rotated self-contained navigation directions. Then, when the position difference (translation amount along x-axis and translation amount along y-axis) between the rotated self-contained navigation position and the GPS position at the same time is determined, the rotated self-contained navigation track Tnr is translated to thereby determine the translation amount by which the degree of coincidence between the GPS track and the self-contained navigation track Tn is the highest at that time. Thus, when a representative value of the position differences between the self-contained navigation positions and the GPS positions at multiple times is determined, the representative value may be assumed as the translation amount (X and Y shown in FIG. 4C) by which the degree of coincidence between the GPS track and the self-contained navigation track Tn is the highest.

The process of comparing the GPS track with the self-contained navigation track shown in FIG. 3 is a process of determining the rotation angle and the translation amount as described above and determining the degree of reliability on the basis of the rotation angle and the translation amount. In order to execute the above process, first, the control unit 20 operates the self-contained navigation information correcting unit 21*d* to acquire a travel distance from the time point at which the process of comparing the GPS track with the self-contained navigation track shown in FIG. 3 is executed last time and then determine whether the travel distance is longer than or equal to a predetermined distance (step S200). When it is determined in step S200 that the travel distance is not longer than or equal to the predetermined distance, the process of step S205 and the following steps are skipped. That is, the comparing process is configured to be executed at an interval of the predetermined distance.

When it is determined in step S200 that the travel distance from the time point at which the process of comparing the GPS track with the self-contained navigation track is executed last time is longer than or equal to the predetermined distance, the control unit 20 operates the GPS track acquisition unit 21*c* to acquire a GPS track and operates the self-contained navigation track acquisition unit 21*a* to acquire a self-contained navigation track (step S205). Subsequently, the control unit 20 operates the self-contained navigation information correcting unit 21*d* to acquire the direction differences between the GPS satellite directions and the self-contained navigation directions (step S210). That is, the control unit 20 acquires GPS satellite directions and self-contained navigation directions at multiple positions on the basis of the pieces of GPS information and pieces of self-contained navigation information that are acquired within a predetermined period of time, and then acquires the direction differences between the GPS satellite directions and the self-contained navigation directions, each pair of which are acquired at the same time.

Furthermore, the control unit 20 operates the self-contained navigation information correcting unit 21*d* to generate a frequency distribution of the direction differences with a weight corresponding to a GPS accuracy (step S215). The accuracy of each GPS direction (GPS satellite direction) is determined by the GPS accuracy information, so a statistical process for determining the direction difference between the GPS track and the self-contained navigation track is configured so that GPS information more significantly contributes to determining the direction difference as the accuracy of the GPS direction increases. Specifically, the control unit 20 acquires GPS accuracies, determines the frequency of each direction difference acquired in step S210 so that the frequency increases as the accuracy of a GPS direction increases, and then generates the frequency distribution. Note that the frequency just needs to be set so that the frequency increases as the accuracy of a GPS direction increases, and, for example, the accuracy information of a GPS direction, which is normalized to increase as the accuracy increases, may be used as the frequency or the accuracy information of a GPS direction, which is multiplied by a predetermined coefficient, may be used as the frequency.

FIG. 5A to FIG. 8D are views for illustrating the statistical process for determining direction differences between GPS directions and self-contained navigation directions and a representative value of the direction differences. In each of FIG. 5A, FIG. 6A, FIG. 7A and FIG. 8A, the straight arrows extending from the solid circle indicate directions within the coordinate system. FIG. 5B, FIG. 6B, FIG. 7B and FIG. 8B show the frequency distributions respectively generated on the basis of the directions shown in FIG. 5A, FIG. 6A, FIG. 7A and FIG. 8A. FIG. 5A to FIG. 6B show the statistical process on the GPS satellite directions and the self-contained navigation directions.

That is, FIG. 5A and FIG. 5B show a GPS satellite direction Gds1 at certain time and a self-contained navigation direction Nd1 at the same time. In this example, the direction difference between the self-contained navigation direction Nd1 and the GPS satellite direction Gds1 is 10°, the accuracy information of the GPS direction is 40, and 80 that is a value obtained by multiplying the accuracy information of the GPS direction by 2 is set as the total frequency of the direction difference 10°. Furthermore, in this example, the frequency is smoothed so that there is a single peak of the frequency distribution even with a relatively small number of samples, and the frequency of the direction difference between the self-contained navigation direction Nd1 and the GPS satellite direction Gds1 is half the above total frequency. Moreover, the frequency of the direction difference that is obtained by adding 10° to the direction difference between the self-contained navigation direction Nd1 and the GPS satellite direction Gds1 is a quarter of the above total frequency, and the frequency of the direction difference that is obtained by subtracting 10° from the direction difference between the self-contained navigation direction Nd1 and the GPS satellite direction Gds1 is a quarter of the above total frequency. That is, the statistical process is executed to form a frequency distribution (Pa shown in FIG. 5B) that has a significant frequency even around the direction difference between the self-contained navigation direction Nd1 and the GPS satellite direction Gds1.

FIG. 6A and FIG. 6B show a GPS satellite direction Gds2 at time subsequent to that of the GPS satellite direction Gds1 and a self-contained navigation direction Nd2 at the same time as that of the GPS satellite direction Gds2. In this example, the direction difference between the self-contained navigation direction Nd2 and the GPS satellite direction Gds2 is 20°, and the accuracy information of the GPS direction is 20. Thus, the total frequency of the direction difference 20° is 40, and the frequency of 20° that is the direction difference between the self-contained navigation direction Nd2 and the GPS satellite direction Gds2 is 20 (40×½). In addition, the frequency of the direction difference that is obtained by adding 10° to 20° that is the direction difference between the self-contained navigation direction Nd2 and the GPS satellite direction Gds2 and the frequency of the direction difference that is obtained by subtracting 10° from 20° that is the direction difference between the self-contained navigation direction Nd2 and the GPS satellite direction Gds2 are 10 (40×¼). FIG. 6B shows the thus generated frequency distribution Pb to be added to the frequency distribution by hatching.

After the frequency distribution is generated on the basis of the GPS satellite directions as described above, the control unit 20 executes the process of adding frequencies based on the direction differences between GPS intercoordinate directions and self-contained navigation directions to the frequency distribution. Therefore, first, the control unit 20 operates the self-contained navigation information correcting unit 21*d* to acquire the direction differences between GPS intercoordinate directions and self-contained navigation directions (step S220). Specifically, the control unit 20 determines vectors each of which connects adjacent two GPS positions on the basis of the pieces of GPS information acquired within a predetermined period of time, acquires GPS intercoordinate directions on the basis of the vectors, acquires self-contained navigation directions on the basis of the pieces of self-contained navigation information acquired within the predetermined period of time, and acquires the direction differences between the GPS intercoordinate directions and the self-contained navigation directions, each pair of which are acquired at the same time.

Furthermore, the control unit 20 operates the self-contained navigation information correcting unit 21$d$ to add the frequencies of the direction differences to the frequency distribution with a weight corresponding to a GPS accuracy (step S225). Each GPS intercoordinate direction is determined by adjacent two GPS positions, so the accuracy of each GPS intercoordinate direction depends on the accuracy of the adjacent two GPS positions. Therefore, the accuracy of each GPS intercoordinate direction is determined by the geometric mean of the GPS accuracies of the adjacent two GPS positions that are consulted when the GPS intercoordinate direction is determined. Then, the control unit 20 determines the frequency of each direction difference acquired in step S220 so that the frequency increases as the accuracy of the GPS intercoordinate direction increases, and then adds the determined frequency to the frequency distribution. Note that the frequency just needs to be set so that the frequency increases as the GPS accuracy increases. In this example, the above described geometric mean is directly used as the frequency.

FIG. 7A to FIG. 8B show the statistical process on the GPS intercoordinate directions and the self-contained navigation directions. That is, FIG. 7A and FIG. 7B show a GPS intercoordinate direction Gdc1 at certain time and a self-contained navigation direction Nd1 at the same time. This example shows a state where the direction difference between the self-contained navigation direction Nd1 and the GPS intercoordinate direction Gdc1 is −10°, the pieces of accuracy information of the GPS positions for determining the GPS intercoordinate direction are 60 and 80 and, as a result, the accuracy information of the GPS intercoordinate direction is 69 $((60\times80)^{1/2})$. In this case, 69 that is the accuracy information of the GPS intercoordinate direction is a total frequency of the direction difference −10°, and a distribution Pc that is generated so that the frequency of the direction difference −10° is a value obtained by multiplying 69 by ½ and the frequency of the direction difference −20° and the frequency of the direction difference 0° are values obtained by multiplying 69 by ¼ is added to the frequency distribution.

Similarly, FIG. 8A and FIG. 8B show a GPS intercoordinate direction Gdc2 at time subsequent to that of the GPS intercoordinate direction Gdc1 and a self-contained navigation direction Nd2 at the same time as that of the GPS intercoordinate direction Gdc2. This example shows a state where the direction difference between the self-contained navigation direction Nd2 and the GPS intercoordinate direction Gdc2 is 20°, the pieces of accuracy information of the GPS positions for determining the GPS intercoordinate direction are 80 and 100 and, as a result, the accuracy information of the GPS intercoordinate direction is 89 $((80\times100)^{1/2})$. In this case, 89 that is the accuracy information of the GPS intercoordinate direction is a total frequency of the direction difference 20°, a frequency distribution Pd that is generated so that the frequency of the direction difference 20° is a value obtained by multiplying 89 by ½ and the frequency of the direction difference 30° and the frequency of the direction difference 10° are values obtained by multiplying 89 by ¼ is added to the frequency distribution. FIG. 7B shows the frequency distribution Pc to be added to the frequency distribution by hatching. FIG. 8B shows the frequency distribution Pd to be added to the frequency distribution by hatching.

After that, the control unit 20 operates the self-contained navigation information correcting unit 21$d$ to acquire the rotation angle of the self-contained navigation track Tn (step S230). That is, the control unit 20 determines a representative value of the direction differences on the basis of the frequency distribution generated through the process of steps S215 and S225, and acquires the representative value as the rotation angle of the self-contained navigation track Tn. Specifically, the control unit 20 assumes the direction difference having the highest frequency in the frequency distribution generated through the process of steps S215 and S225 as a representative value of the direction differences between the self-contained navigation track Tn and the GPS track, and then assumes the representative value as the rotation angle (rotation angle α shown in FIG. 4C) when the self-contained navigation track is rotated so as to obtain the highest degree of coincidence between the self-contained navigation track and the GPS track. Thus, in the present embodiment, the rotation angle is the first correction amount of the self-contained navigation direction for obtaining the highest degree of coincidence between the self-contained navigation track and the GPS track.

Furthermore, the control unit 20 operates the self-contained navigation information correcting unit 21$d$ to acquire the degree of reliability of the GPS direction (step S235). In the present embodiment, the control unit 20 acquires the degree of reliability of the GPS direction on the basis of the frequency distribution generated through the process of steps S215 and S225. Specifically, the control unit 20 determines the direction difference having the highest frequency in the frequency distribution generated through the process of steps S215 and S225, a variance of that direction difference and a total frequency of the frequency distribution. Then, the degree of reliability of the GPS direction is set so that the degree of reliability increases as the frequency of the direction difference having the highest frequency increases, the degree of reliability increases as the variance of the direction difference reduces and the degree of reliability increases as the total frequency of the frequency distribution increases. Note that, in the present embodiment, the degree of reliability of the GPS direction is defined in five levels. That is, a map (not shown) for determining the degree of reliability of the GPS direction on the basis of the frequency of the direction difference having the highest frequency, the variance of the direction difference and the total frequency of the frequency distribution is prepared, and the control unit 20 acquires the degree of reliability of the GPS direction on the basis of the map.

Subsequently, the control unit 20 operates the self-contained navigation information correcting unit 21$d$ to rotate the self-contained navigation track (step S240). That is, the control unit 20 rotates the self-contained navigation track by the rotation angle acquired in step S230 in a state where the shape of the self-contained navigation track is maintained within the prescribed coordinate system. For example, as shown in FIG. 4C, the self-contained navigation track Tn is rotated by the angle α about the most previous self-contained navigation position in the self-contained navigation track Tn within the x-y coordinate system to acquire the self-contained navigation track Tnr.

After that, the control unit 20 operates the self-contained navigation information correcting unit 21$d$ to acquire the position differences between the GPS positions and the self-contained navigation positions (step S245). That is, the control unit 20 acquires a plurality of GPS positions and a plurality of self-contained navigation positions on the basis of the pieces of GPS information acquired within a predetermined period of time and the pieces of self-contained navigation information rotated in step S240, and then acquires the position differences between the GPS positions and the self-contained navigation positions, each pair of which are acquired at the same time.

Furthermore, the control unit 20 operates the self-contained navigation information correcting unit 21d to generate a frequency distribution of the position differences with a weight corresponding to a GPS accuracy (step S250). That is, the accuracy of each GPS position is determined by the GPS accuracy information, so GPS information more significantly contributes to determining the position difference as the accuracy of the GPS position increases. Specifically, the control unit 20 acquires GPS accuracies, determines the frequency of each position difference acquired in step S245 so that the frequency increases as the accuracy of a GPS position increases, and then generates a frequency distribution by adding the determined frequency to the frequency distribution. Note that the frequency of each position difference just needs to be set so that the frequency increases as the accuracy of a GPS position increases, and, for example, the accuracy information of a GPS position, which is normalized to increase as the accuracy increases, may be used as the frequency or the accuracy information of a GPS position, multiplied by a predetermined coefficient, may be used as the frequency.

Figure 9A:
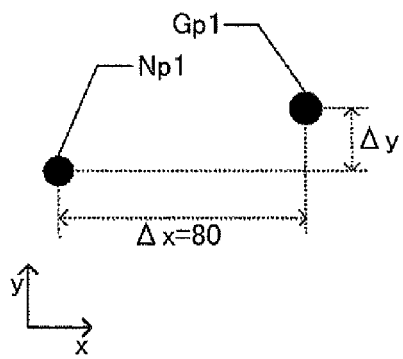
FIG. 9A to FIG. 11B are views for illustrating a statistical process for determining position differences and a representative value of the position differences.
Figure 9B:
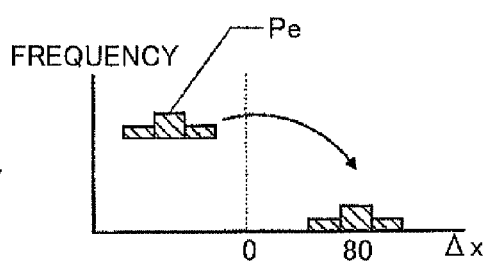
Figure 10A:
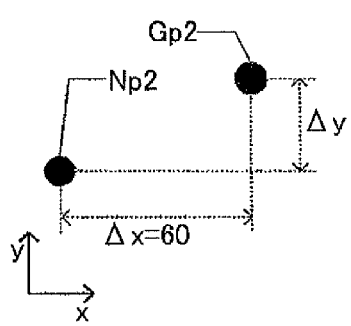
Figure 10B:
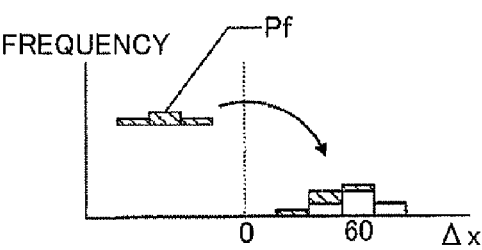
Figure 11A:
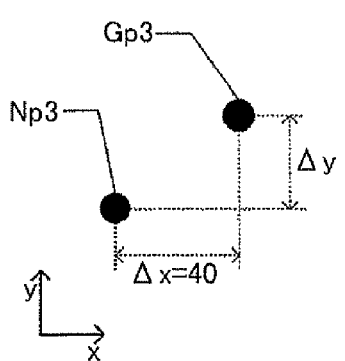
Figure 11B:
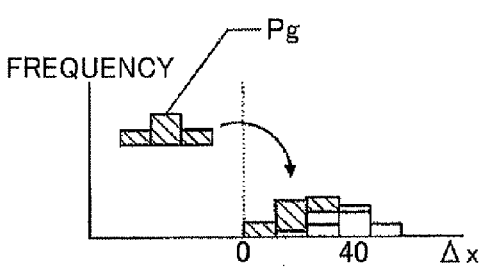

FIG. 9A to FIG. 11B are views for illustrating the statistical process for determining position differences between GPS positions and self-contained navigation positions and a representative value of the position differences. In FIG. 9A, FIG. 10A and FIG. 11A, the solid circles indicate positions within the coordinate system. FIG. 9B, FIG. 10B and FIG. 11B show frequency distributions respectively generated on the basis of the positions shown in FIG. 9A, FIG. 10A and FIG. 11A. FIG. 9A and FIG. 9B show a GPS position Gp1 at certain time and a self-contained navigation position Np1 at the same time. In addition, FIG. 10A and FIG. 10B show a GPS position Gp2 at time subsequent to that of the GPS position Gp1 and a self-contained navigation position Np2 at the same time as that of the GPS position Gp2, and FIG. 11A and FIG. 11B show a GPS position Gp3 at time subsequent to the GPS position Gp2 and a self-contained navigation position Np3 at the same time as that of the GPS position Gp3.

As shown in these examples, the position difference between the self-contained navigation position Np1 and the GPS satellite position Gp1 is defined by a position difference Δx in the x-axis direction and a position difference Δy in the y-axis direction, and a frequency distribution is generated for a position difference in each axis direction; however, FIG. 9B, FIG. 10B and FIG. 11B just illustrate a position difference Δx in the x-axis direction. Of course, a position difference in the y-axis direction just differs from a position difference in the x-axis direction in a difference acquired as a position difference, and the process of generating a frequency distribution is almost the same.

For a position difference as well, a total frequency of position differences is determined on the basis of the pieces of accuracy information of the GPS positions when a frequency distribution is generated, and the frequencies are smoothed so that there is a single peak of the frequency distribution even with a relatively small number of samples. In the example shown in FIG. 9A and FIG. 9B, the position difference Δx between the self-contained navigation position Np1 and the GPS satellite position Gp1 is 80, and the accuracy information of the GPS position is 80. In the example shown in FIG. 10A and FIG. 10B, the position difference Δx between the self-contained navigation position Np2 and the GPS satellite position Gp2 is 60, and the accuracy information of the GPS position is 40. Furthermore, in the example shown in FIG. 11A and FIG. 11B, the position difference Δx between the self-contained navigation position Np3 and the GPS satellite position Gp3 is 40, and the accuracy information of the GPS position is 100.

For a GPS position, the accuracy information of the GPS position is configured to be a total frequency, and the accuracy information of the GPS position is 80 in FIG. 9A and FIG. 9B, so the total frequency of the position difference Δx=80 between the self-contained navigation position Np1 and the GPS position Gp1 is 80. Then, the frequency of the position difference Δx=80 is half the total frequency, and the frequency of the position difference, obtained by adding 20 to the position difference Δx between the self-contained navigation position Np1 and the GPS satellite position Gp1, and the frequency of the position difference, obtained by subtracting 20 from the position difference Δx between the self-contained navigation position Np1 and the GPS satellite position Gp1, each are a quarter of the total frequency. In this manner, a frequency distribution (Pe shown in FIG. 9B) that also has a significant frequency around the position difference Δx between the self-contained navigation position Np1 and the GPS satellite position Gp1 is generated.

In FIG. 10A and FIG. 10B, the accuracy information of the GPS position is 40, so the total frequency of the position difference Δx=60 between the self-contained navigation position Np2 and the GPS position Gp2 is 40. Then, a frequency distribution Pf is generated so that the frequency of the position difference Δx=60 is half the total frequency and the frequencies of the position differences Δx=40 and 80 each are a quarter of the total frequency. In FIG. 11A and FIG. 11B, the accuracy information of the GPS position is 100, so the total frequency of the position difference Δx=40 between the self-contained navigation position Np3 and the GPS position Gp3 is 100. Then, a frequency distribution Pg is generated so that the frequency of the position difference Δx=40 is half the total frequency and the frequencies of the position differences Δx=20 and 60 each are a quarter of the total frequency. FIG. 9B, FIG. 10B and FIG. 11B show the frequency distributions Pe to Pg to be added to the frequency distribution by hatching.

After the frequency distribution is generated on the basis of the GPS positions as described above, the control unit 20 operates the self-contained navigation information correcting unit 21d to acquire the translation amount of the self-contained navigation track (step S255). That is, the control unit 20 determines a representative value of the position differences on the basis of the frequency distribution generated through the process of step S250, and then acquires the representative value as the translation amount of the self-contained navigation track. Specifically, the control unit 20 determines the position difference having the highest frequency in the frequency distribution generated through the process of step S250 for each of Δx and Δy, and then assumes each of the position differences as a representative value of the position difference between the self-contained navigation track and the GPS track. Then, the control unit 20 assumes the respective representative values as the translation amount in the x-axis direction and the translation amount in the y-axis direction (X and Y shown in FIG. 4C) when the self-contained navigation track is translated so as to obtain the highest degree of coincidence between the self-contained navigation track and the GPS track. Thus, in the present embodiment, the translation amount in the x-axis direction and the translation amount in the y-axis direction correspond to the first correction amount of the self-contained navigation positions for obtaining the highest degree of coincidence between the self-contained navigation track and the GPS track.

Furthermore, the control unit 20 operates the self-contained navigation information correcting unit 21*d* to acquire the degree of reliability of the GPS position (step S260). In the present embodiment, the control unit 20 acquires the degree of reliability of the GPS position on the basis of the frequency distribution generated through the process of step S250. Specifically, the control unit 20 determines the position difference having the highest frequency in the frequency distribution generated through the process of step S250, a variance of that position difference and a total frequency of the frequency distribution. Then, the degree of reliability of the GPS position is set so that the degree of reliability increases as the frequency of the position difference having the highest frequency increases, the degree of reliability increases as the variance of the position difference reduces and the degree of reliability increases as the total frequency of the frequency distribution increases. Note that, in the present embodiment, the degree of reliability of the GPS position is defined in five levels. That is, a map (not shown) for determining the degree of reliability of the GPS position on the basis of the frequency of the position difference having the highest frequency, the variance of the position difference and the total frequency of the frequency distribution is prepared, and the control unit 20 acquires the degree of reliability of the GPS position on the basis of the map.

The thus described degrees of reliability of the GPS direction and GPS position are respectively determined on the basis of the statistics on the plurality of GPS directions and the plurality of GPS positions, so the degrees of reliability of the GPS direction and GPS position indicate the degree of reliability of the GPS track. On the other hand, GPS accuracy information indicates the accuracy of each GPS direction and the accuracy of each GPS position. Thus, the degree of reliability of each of the GPS direction and the GPS position is determined through statistical process based on the pieces of GPS accuracy information, and the degree of reliability of a track determined from the pieces of GPS information may be defined by the degree of reliability of each of the GPS direction and the GPS position. Note that a method of determining the degree of reliability is not limited to the above described technique; for example, GPS accuracy information may be used as the degree of reliability.

When the process of comparing the GPS track with the self-contained navigation track in this way, the control unit 20 returns to the process shown in FIG. 2A and FIG. 2B. That is, the control unit 20 operates the self-contained navigation information correcting unit 21*d* to compare the degree of reliability of the GPS direction with the degree of reliability of the matching direction and then determine whether the degree of reliability of the GPS direction is higher than or equal to the degree of reliability of the matching direction (step S110). Then, when it is determined in step S110 that the degree of reliability of the GPS direction is higher than or equal to the degree of reliability of the matching direction, the control unit 20 uses the GPS track as a correction target track to set a direction correction target(step S115). That is, the control unit 20 rotates the self-contained navigation track by the rotation angle acquired in step S230, translates the self-contained navigation track by the translation amount acquired in step S255, and sets a direction oriented as a result of rotation and translation of the self-contained navigation direction at the latest time point as the direction correction target. For example, in the rotated and translated self-contained navigation track Tnm as shown in FIG. 4C, the direction in which the distal end of the arrow is oriented is the direction oriented as a result of rotation and translation of the self-contained navigation direction at the latest time point, so the direction in which the distal end of the arrow is oriented is the direction correction target.

On the other hand, when it is determined in step S110 that the degree of reliability of the GPS direction is not higher than or equal to the degree of reliability of the matching direction, the control unit 20 uses the matching track as a correction target track to set a direction correction target (step S120). That is, the control unit 20 sets the matching direction as the correction target direction.

Subsequently, the control unit 20 operates the self-contained navigation information correcting unit 21*d* to compare the degree of reliability of the GPS position with the degree of reliability of the matching position and then determine whether the degree of reliability of the GPS position is higher than or equal to the degree of reliability of the matching position (step S125). Then, when it is determined in step S125 that the degree of reliability of the GPS position is higher than or equal to the degree of reliability of the matching position, the control unit 20 uses the GPS track as a correction target track to set a position correction target (step S130). That is, the control unit 20 rotates the self-contained navigation track by the rotation angle acquired in step S230, translates the self-contained navigation track by the translation amount acquired in step S255, and uses a position resulting from rotation and translation of the self-contained navigation position at the latest time point as the position correction target. For example, in the rotated and translated self-contained navigation track Tnm as shown in FIG. 4C, the position (position indicated by the outline circle in FIG. 4C) of the distal end of the arrow is the position resulting from rotation and translation of the self-contained navigation position at the latest time point, so the position at which the distal end of the arrow is present is the position correction target.

On the other hand, when it is determined in step S125 that the degree of reliability of the GPS position is not higher than or equal to the degree of reliability of the matching position, the control unit 20 uses the matching track as a correction target track to set a position correction target (step S135). That is, the control unit 20 uses the matching position as the correction target position.

After that, the control unit 20 operates the self-contained navigation information correcting unit 21*d* to acquire the degree of reliability of the correction target (step S140). In the present embodiment, the correction target is set for each of the direction and the position, so the degree of reliability is acquired for each of the direction and the position. Here, the degree of reliability of the correction target corresponds to the degree of reliability of the correction target track. Thus, the degree of reliability of the GPS position in the case where step S115 is executed or the degree of reliability of the matching position in the case where step S120 is executed is acquired as the degree of reliability of the position correction target. In addition, the degree of reliability of the GPS direction in the case where step S130 is executed or the degree of reliability of the matching direction in the case where step S135 is executed is acquired as the degree of reliability of the direction correction target.

Figure 12:
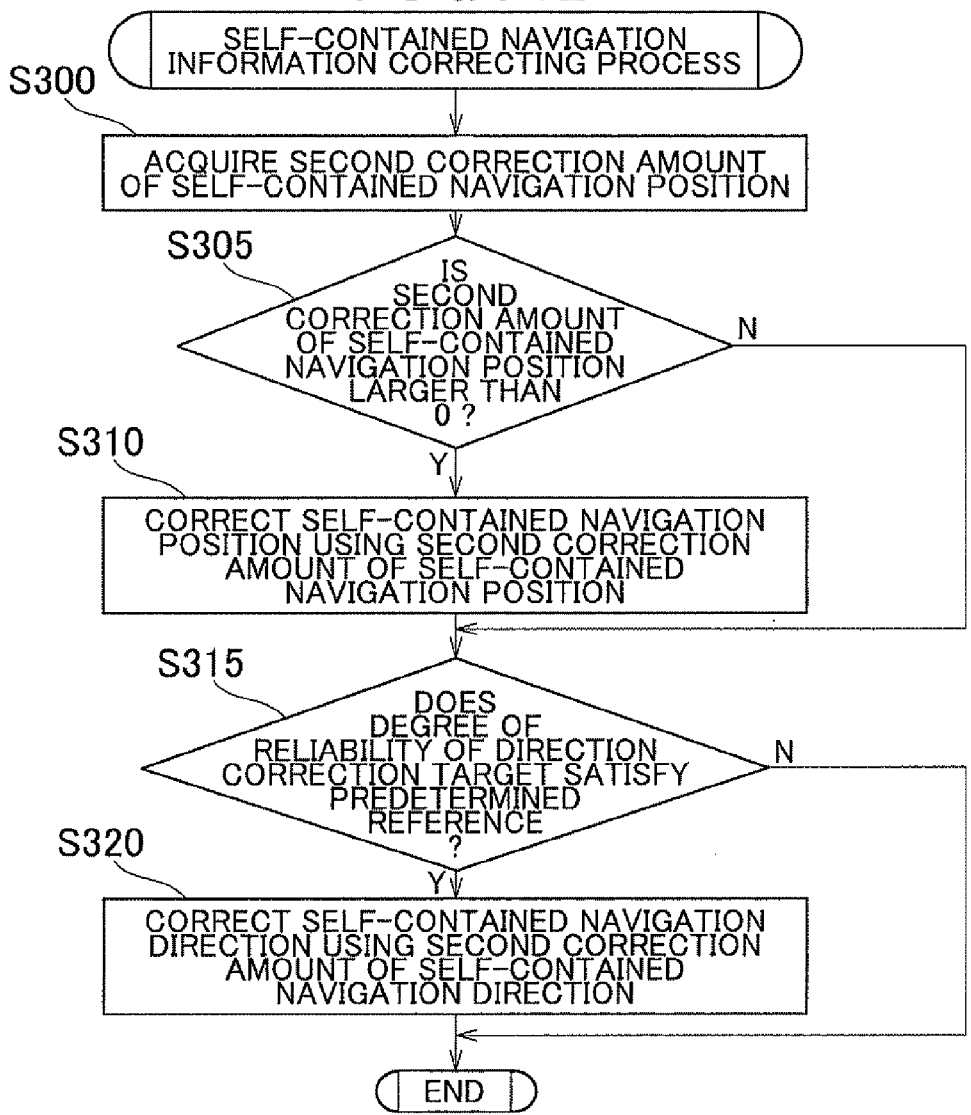
FIG. 12 is a flowchart that shows a self-contained navigation information correcting process.

Furthermore, the control unit 20 operates the self-contained navigation information correcting unit 21*d* to execute the self-contained navigation information correcting process for correcting the self-contained navigation direction and the self-contained navigation position (step S145). FIG. 12 is a flowchart that shows the self-contained navigation information correcting process. In the self-contained navigation information correcting process, the control unit 20 first acquires the second correction amount of the self-contained navigation position (step S300). In the present embodiment, the second correction amount of the self-contained navigation position is determined on the basis of the degree of reliability of the correction target track (GPS track or matching track), a value obtained by subtracting the degree of reliability of the self-contained navigation track from the degree of reliability of the correction target track and the first correction amount of the self-contained navigation position.

Specifically, a map (not shown) defines that the second correction amount of the self-contained navigation position increases as the degree of reliability of the correction target track increases, the second correction amount of the self-contained navigation position increases as the value obtained by subtracting the degree of reliability of the self-contained navigation track from the degree of reliability of the correction target track increases, and the second correction amount of the self-contained navigation position increases as the first correction amount of the self-contained navigation position increases. However, in the map, the second correction amount of the self-contained navigation position is smaller than the first correction amount. The control unit 20 acquires the second correction amount of the self-contained navigation position on the basis of the map.

That is, as the degree of reliability of the correction target track increases, the probability of erroneously correcting the self-contained navigation track so as to coincide with the correction target track decreases. Then, the second correction amount of the self-contained navigation position is set so as to increase as the degree of reliability of the GPS track increases. By so doing, it is possible to reduce the probability of occurrence of erroneous correction and early improve the accuracy of the self-contained navigation track.

In addition, the correction target track is a reference used to determine the first correction amount of the self-contained navigation position for obtaining the highest degree of coincidence between the self-contained navigation track and the correction target track, and the self-contained navigation track is a correction subject. Thus, the value obtained by subtracting the degree of reliability of the self-contained navigation track from the degree of reliability of the correction target track is a value obtained by subtracting the degree of reliability of the correction subject from the degree of reliability of the correction reference, and that value increases as the degree of reliability of the correction reference becomes higher than the degree of reliability of the correction subject. Then, the second correction amount of the self-contained navigation position is set so as to increase with an increase in the value obtained by subtracting the degree of reliability of the self-contained navigation track from the degree of reliability of the correction target track. By so doing, it is possible to reduce the probability of occurrence of erroneous correction and early improve the accuracy of the self-contained navigation track. Note that the degree of reliability of the self-contained navigation track just needs to indicate the degree of reliability of information, such as the self-contained navigation position and the self-contained navigation direction. In the present embodiment, the self-contained navigation position and the self-contained navigation direction are repeatedly corrected, and the correction reference consulted in a previous correction is a previous correction target track. Thus, in the present embodiment, after a correction is performed, the degree of reliability of a previous correction target track used as the correction reference is assumed as the degree of reliability of each of the corrected self-contained navigation position and the corrected self-contained navigation direction.

Furthermore, the first correction amount of the self-contained navigation position indicates the degree of difference between the self-contained navigation track and the correction target track. Then, the second correction amount of the self-contained navigation position is set so as to increase with an increase in the difference between the self-contained navigation track and the correction target track. By so doing, it is possible to early improve the accuracy of the self-contained navigation track. Note that, in the present embodiment, the degree of reliability of the correction target track and the degree of reliability of the self-contained navigation track each are defined in five levels. Therefore, it is only necessary that the second correction amount of the self-contained navigation position increases in a stepwise manner as the degree of reliability of the correction target track increases and the second correction amount of the self-contained navigation position increases in a stepwise manner as the value obtained by subtracting the degree of reliability of the self-contained navigation track from the degree of reliability of the correction target track increases. In addition, it is also applicable that the second correction amount of the self-contained navigation position varies continuously or varies in a stepwise manner in accordance with the first correction amount of the self-contained navigation position.

Here, it is only necessary that the second correction amount tends to increase as the degree of reliability of the correction target track increases, the second correction amount tends to increase as the value obtained by subtracting the degree of reliability of the self-contained navigation track from the degree of reliability of the correction target track increases and the second correction amount tends to increase as the first correction amount of the self-contained navigation position increases. Thus, it is applicable that the second correction amount varies in m levels (m is a natural number) with a variation in the degree of reliability in n levels (n is a natural number). Furthermore, the second correction amount may be determined on the basis of any one of or a combination of any two of the degree of reliability of the correction target track, the value obtained by subtracting the degree of reliability of the self-contained navigation track from the degree of reliability of the correction target track and the first correction amount of the self-contained navigation position.

In the above described manner, when the second correction amount of the self-contained navigation position is acquired in step S300, the control unit 20 operates the self-contained navigation information correcting unit 21*d* to determine whether the second correction amount of the self-contained navigation position is larger than 0 (step S305), and then, when it is determined in step S305 that the second correction amount of the self-contained navigation position is not larger than 0, the control unit 20 skips step S310.

Figure 13A:
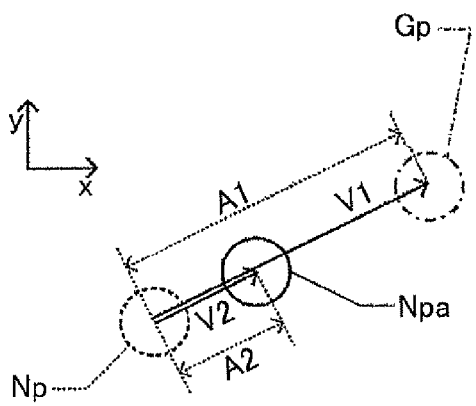
FIG. 13A is a view that illustrates a manner of correcting a self-contained navigation position.

When it is determined in step S305 that the second correction amount of the self-contained navigation position is larger than 0, the control unit 20 corrects the self-contained navigation position using the second correction amount of the self-contained navigation position (step S310). FIG. 13A is a view that illustrates a manner of correcting the self-contained navigation position using the second correction amount of the self-contained navigation position. In FIG. 13A, an example of a position correction target Gp in the case where the correction target track is a GPS track is indicated by the alternate long and short dashed line circle, and the pre-corrected self-contained navigation position Np is indicated by the broken line circle. In this example, the first correction amount of the self-contained navigation position Np is A1, and the second correction amount is A2.

As shown in FIG. 13A, the second correction amount A2 is set so as to achieve part of a correction achieved by the first correction amount A1 and is smaller than the first correction amount A1. That is, a correction achieved by the first correction amount A1 is, for example, a correction such that the self-contained navigation position Np is translated along a vector V1 directed from the self-contained navigation position Np toward the correction target Gp, and the vector V1, for example, has a length of X along x-axis and a length of Y along y-axis in the example shown in FIG. 4C. On the other hand, the second correction amount A2 corresponds to a correction such that the self-contained navigation position Np is translated along a vector V2 obtained by multiplying the vector V1 by a coefficient C (0<C<1). The coefficient C is determined in the above described step S310. Thus, for example, in the example shown in FIG. 4C, a correction using the second correction amount A2 is determined by multiplying each of X and Y by the coefficient C that indicates the second correction amount, and the corrected self-contained navigation position Npa is determined as indicated by the solid line circle. In the above correction, the control unit 20 corrects the self-contained navigation position using the second correction amount A2 that is smaller than the first correction amount, which is the correction amount of the self-contained navigation position for obtaining the highest degree of coincidence between the self-contained navigation track and the correction target track. Thus, even if an erroneous correction is performed, a correction may be performed so as to suppress the influence thereof, so it is possible to easily improve the accuracy of the self-contained navigation track.

Subsequently, the control unit 20 corrects the self-contained navigation direction in steps S315 and S320. In the present embodiment, the control unit 20 is configured to correct the self-contained navigation direction by a constant correction amount. Then, the control unit 20 operates the self-contained navigation information correcting unit 21d to determine whether the degree of reliability of the direction correction target satisfies a predetermined reference (step S315). In the present embodiment, the control unit 20 determines that the degree of reliability of the direction correction target satisfies the predetermined criteria when the degree of reliability of the direction correction target is higher than or equal to a predetermined minimum degree of reliability required as the correction reference.

Then, when it is determined in step S315 that the degree of reliability of the direction correction target does not satisfy the predetermined criteria, the control unit 20 skips step S320. On the other hand, when it is determined in step S315 that the degree of reliability of the direction correction target satisfies the predetermined criteria, the control unit 20 operates the self-contained navigation information correcting unit 21d to correct the self-contained navigation direction using the second correction amount of the self-contained navigation direction (step S320). Here, the second correction amount of the self-contained navigation direction is a constant value. For example, when the first correction amount is larger than 1°, the second correction amount is set at 1°, or the like; whereas, when the first correction amount is smaller than or equal to 1°, the second correction amount is set at 0°, or the like.

Figure 13B:
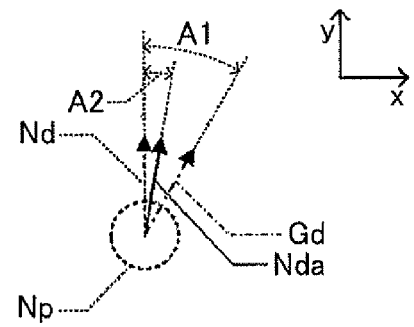
FIG. 13B is a view that illustrates a manner of correcting a self-contained navigation direction.

FIG. 13B is a view that illustrates a manner of correcting the self-contained navigation direction using the second correction amount of the self-contained navigation direction. In FIG. 13B, a direction correction target Gd in the case where the correction target track is a GPS track is illustrated by the alternate long and short dashed straight arrow, and the pre-corrected self-contained navigation direction Nd is illustrated by the broken straight arrow. In this example, the first correction amount of the self-contained navigation direction Nd is A1 and the second correction amount of the self-contained navigation direction Nd is A2.

That is, a correction achieved by the first correction amount A1 is, for example, a correction such that the self-contained navigation direction Nd is rotated to coincide with the correction target Gd, and the rotation angle is, for example, the rotation angle a $\alpha$ in the example shown in FIG. 4C. On the other hand, a correction achieved by the second correction amount A2 is, for example, a correction such that the self-contained navigation direction Nd is rotated by 1° to approach the correction target Gd. In the above described correction, the control unit 20 corrects the self-contained navigation direction using the constant second correction amount A2 that is smaller than the first correction amount A1, which is the correction amount of the self-contained navigation direction for obtaining the highest degree of coincidence between the self-contained navigation track and the correction target track. Thus, it is possible to improve the accuracy of the self-contained navigation track in a state where the influence due to an erroneous correction is considerably minimized.

When the self-contained navigation information is corrected through the above process, the control unit 20 returns to the process shown in FIG. 2A and FIG. 2B, and then operates the self-contained navigation information correcting unit 21d to update the degree of reliability of the self-contained navigation information (step S150). That is, the control unit 20 uses the degree of reliability of the position correction target acquired in step S140 as the degree of reliability of the self-contained navigation position, and uses the degree of reliability of the direction correction target acquired in step S140 as the degree of reliability of the self-contained navigation direction.

As described above, the self-contained navigation information just needs to be corrected so that the self-contained navigation track is compared with the GPS track and then the difference between the self-contained navigation track and the GPS track is reduced. The self-contained navigation track is compared with the GPS track to determine the difference therebetween. By so doing, it is possible to determine the correction to be performed on the self-contained navigation information in order to reduce the difference between the self-contained navigation track and the GPS track. The correction to be performed on the self-contained navigation information may be a correction for eliminating the difference between the self-contained navigation track, and the GPS track, and is desirably a correction for reducing the difference without completely eliminating the difference between the self-contained navigation track and the GPS track. When the latter correction is repeated, it is possible to gradually bring the self-contained navigation track close to the GPS track. In addition, even if an erroneous correction is performed because of a large error of the GPS track, it is possible to suppress the influence of the erroneous correction rather than a correction for eliminating the difference between the self-contained navigation track and the GPS track at a time is performed.

In addition, various techniques may be employed to correct the self-contained navigation information for reducing the difference between the self-contained navigation track and the GPS track. For example, it is applicable that the self-contained navigation track is rotated and translated so as to obtain the highest degree of coincidence between the self-contained navigation track and the GPS track, the self-contained navigation information that indicates the rotated and translated self-contained navigation track is set as a correction target and then the self-contained navigation information is corrected so as to reduce the difference from the correction target. That is, if the self-contained navigation track is rotated and translated to obtain the highest degree of coincidence between the self-contained navigation track and the GPS track, the self-contained navigation information may be assumed to be inaccurate by the physical quantity corresponding to the rotation and translation. Then, when the correction target of the self-contained navigation information is set on the basis of the rotated and translated track and then the self-contained navigation information is corrected so as to reduce the difference between the correction target and the self-contained navigation information, it is possible to improve the accuracy of the self-contained navigation track.

Furthermore, various techniques may be used to determine the rotation angle and translation amount of the self-contained navigation track. For example, it is possible to determine the rotation angle of the rotation from a representative value of the direction differences between the directions of the vehicle, indicated by the pieces of self-contained navigation information at multiple time points, and the directions of the vehicle, indicated by the pieces of GPS information at multiple time points. That is, the directions of the vehicle, indicated by the self-contained navigation track at multiple time points, and the directions of the vehicle, indicated by the GPS track at multiple time points, are acquired, and then a representative value (mean, median, mode, or the like) is statistically determined. With the above configuration, it is possible to determine the rotation angle by which the self-contained navigation track is rotated to bring the self-contained navigation track closest to the GPS track.

In addition, it is possible to determine the translation amount from a representative value of position differences between the positions of the vehicle, indicated by the pieces of self-contained navigation information at multiple time points, and the positions of the vehicle, indicated by the pieces of GPS information at multiple time points. That is, the positions of the vehicle, indicated by the self-contained navigation track at multiple time points, and the positions of the vehicle, indicated by the GPS track at multiple time points, are acquired, and then a representative value (mean, median, mode, or the like) is statistically determined. With the above configuration, it is possible to determine the translation amount by which the self-contained navigation track is translated to bring the self-contained navigation track closest to the GPS track. Note that, here, the position difference just needs to be defined so as to be able to determine the translation amount of the self-contained navigation track and, for example, the position difference is configured to be expressed by a latitude difference and longitude difference between two points in the coordinate system consisting of latitude and longitude.

Furthermore, when a representative value is determined, statistics that reflect the accuracy of the GPS track to be compared with the self-contained navigation track may be performed. That is, in a general positioning system using GPS, it is possible to acquire GPS accuracy information that indicates the accuracy of GPS information. That is, it is possible to acquire an index that indicates the degree of decrease in accuracy of GPS information due to the relative relationship between GPS satellites and the vehicle and the influence of a communication environment together with the GPS information. In addition, the accuracy of the GPS information depends on the state of the vehicle, such as a variation in the direction of the vehicle and a vehicle speed within a predetermined period of time, so it is possible to acquire an index that indicates the degree of decrease in the accuracy of the GPS information due to the state of the vehicle. Then, any one of these indices or a combination of these indices is used as GPS accuracy information, and a frequency distribution is generated for each of a direction difference and a position difference so that the frequency increases as the accuracy of the GPS information indicated by the GPS accuracy information increases. Then, each of a representative value of the direction differences and a representative value of the position differences is determined on the basis of the frequency distribution. With the above configuration, GPS information more significantly influences the frequency distribution as the accuracy of the GPS information increases, so it is possible to increase the accuracy of a representative value of the direction differences, obtained from the frequency distribution, and the accuracy of a representative value of the position differences, obtained from the frequency distribution.

(3) Alternative Embodiments

The above embodiment is one example for carrying out the aspect of the present invention, and other various embodiments may be employed. For example, it is applicable that a GPS track is used as a correction target track as long as the degree of reliability of the GPS track is high so that the GPS track may be used as a correction reference. That is, it is applicable that a GPS track is used as a correction target track when the degree of reliability of the GPS track exceeds a predetermined reference, a matching track is used as a correction target track when the degree of reliability of the GPS track is lower than the predetermined reference, and self-contained navigation information is corrected so as to reduce the difference between a self-contained navigation track and the correction target track.

Such a configuration may be implemented in such a manner that steps S110 and S125 in FIG. 2A and FIG. 28 are modified in the above described embodiment. Specifically, the control unit 20 determines in step S110 whether the degree of reliability of a GPS direction satisfies a predetermined reference, executes step S115 when the degree of reliability of the GPS direction satisfies the predetermined reference, and executes step S120 when the degree of reliability of the GPS direction does not satisfy the predetermined reference. In addition, the control unit 20 determines in step S125 whether the degree of reliability of a GPS position satisfies a predetermined reference, executes step S130 when the degree of reliability of the GPS position satisfies the predetermined reference, and executes step S135 when the degree of reliability of the GPS position does not satisfy the predetermined reference. Note that the predetermined reference just needs to be a reference for determining whether the accuracy of the self-contained navigation information may be improved when the GPS track is used as a correction target track to correct the self-contained navigation information and, for example, it is applicable that a lower limit is set for the degree of reliability and then it is determined whether the degree of reliability is higher than or equal to the lower limit.

With the above configuration, the GPS track is used as a correction target track when the degree of reliability of the GPS track is high. By so doing, it is possible to correct the self-contained navigation information on the basis of further objective information. That is, a GPS track is generated on the basis of GPS information, and the GPS information does not depend on self-contained navigation information but a matching track depends on self-contained navigation information because the matching track is determined on the basis of a comparison between a self-contained navigation track and the shape of a road indicated by map information. Thus, when the degree of reliability of GPS information is high and accurate, the GPS information is appropriate as a reference used to correct the self-contained navigation information. Then, when the degree of reliability of a GPS track exceeds a predetermined reference, a reference used to correct the self-contained navigation information is set to the GPS track. By so doing, it is possible to correct the self-contained navigation information on the basis of information that has a high reliability and that does not depend on the self-contained navigation information.

Furthermore, in the above described embodiment, any one of the GPS track and the matching track is selected as a correction target track on the basis of the degree of reliability; however, when both the GPS track and the matching track have a low degree of reliability such that it is not appropriate as a correction reference (the accuracy of the self-contained navigation information is not improved even when a correction is performed), no correction may be performed.

Furthermore, in the configuration that a GPS track is used as a correction target track when the degree of reliability of the GPS track exceeds a predetermined reference, it is not necessary to determine the degree of reliability of a matching track in order to determine a correction target track. In addition, it is applicable that the degree of reliability of a matching track is determined for a purpose other than the purpose of determining a correction target track. For example, when a matching track is used as a correction target track, the degree of reliability of the matching track may be determined in order to determine the degree of reliability of the corrected self-contained navigation track or the degree of reliability of a matching track may be determined in order to determine whether the matching track has a low degree of reliability such that it is not appropriate as a correction reference.

Furthermore, in the above described embodiment, a position correction target and a direction correction target are set on the basis of a correction target track, a second correction amount is set so as to gradually approach the correction targets, and then self-contained navigation information is corrected; instead, self-contained navigation information may be corrected without setting a specific correction target. For example, it is applicable that the rotation angle and translation amount of a self-contained navigation track are determined so that at least the self-contained navigation track approaches a correction target track and then self-contained navigation information is corrected so as to rotate and translate the self-contained navigation track in correspondence with the determined rotation angle and the determined translation amount.

Furthermore, in the above described embodiment, the degree of reliability is defined separately for a position and a direction and a correction is performed in a state where different types of tracks may be respective correction references for a position and a direction; instead, a correction may be configured so that a correction reference is a single type of track. For example, it is applicable that the degree of reliability of each of a GPS position, a GPS direction, a matching position and a matching direction is defined and then, when the degree of reliability of the GPS position has the highest degree of reliability, a direction correction target is set to the GPS direction to thereby use only the GPS track as a correction reference.

Furthermore, in the above described embodiment, a GPS direction is determined on the basis of a GPS satellite direction and a GPS intercoordinate direction; instead, any one of a GPS satellite direction and a GPS intercoordinate direction may be used as a GPS direction. Furthermore, in the above described embodiment, the second correction amounts for a position and a direction are respectively determined by different techniques; instead, the second correction amounts may be determined by the same technique or the second correction amounts may be respectively determined by techniques inverse to those of the above described embodiment. For example, it is applicable that the second correction amount for a position is a constant translation amount and the second correction amount for a direction may increase as the degree of reliability of a correction target track increases, the second correction amount for a direction increases as a value obtained by subtracting the degree of reliability of a self-contained navigation track from the degree of reliability of the correction target track increases and the second correction amount for a direction increases as the first correction amount of the self-contained navigation direction increases.

Furthermore, another sensor, such as an acceleration sensor, may be added as a sensor for acquiring self-contained navigation information. Furthermore, a representative value of GPS positions and a representative value of GPS directions each may be a statistical mean or a statistical median. Moreover, the process of comparing a self-contained navigation track with a GPS track may be changed in accordance with the accuracy of GPS information. For example, it is applicable that a self-contained navigation track is compared with a GPS track in a distance that is reduced as the accuracy of GPS information indicated by GPS accuracy information increases. In the self-contained navigation track, accumulated errors increase over time, so, when the accuracy of GPS information is high, a GPS track is compared with a self-contained navigation track while the accuracy of GPS information remains high rather than a large number of pieces of time-series GPS information are acquired to increase the statistical accuracy. Then, when a self-contained navigation track is compared with a GPS track in a distance that is reduced as the accuracy of GPS information increases, it is possible to easily increase the accuracy of the self-contained navigation track.

Various configurations may be employed as a configuration for comparing a self-contained navigation track with a GPS track in a distance that is reduced as the accuracy of GPS information indicated by GPS accuracy information increases, and the distance in which the self-contained navigation track is compared with the GPS track may vary continuously or may vary in a stepwise manner. As for the latter case, for example, it is applicable that it is determined whether each of the pieces of GPS accuracy information of GPS information included in a range of a first distance from the latest GPS position is higher than or equal to a predetermined value and then a distance used for comparison is determined on the basis of the result of the determination. That is, when each of the pieces of GPS accuracy information is higher than or equal to a predetermined value, a GPS track indicated by pieces of GPS information included in a range of a first distance from the latest GPS position is compared with a self-contained navigation track indicated by pieces of self-contained navigation information included in the range of the first distance from the latest GPS position. In addition, when any one of the pieces of GPS accuracy information is not higher than or equal to the predetermined value, a GPS track indicated by pieces of GPS information included in a range of a second distance, which is longer than the first distance, from the latest GPS position is compared with a self-contained navigation track indicated by pieces of self-contained navigation information included in the range of the second distance from the latest GPS position. Of course, this configuration is one example. It is applicable that first to nth predetermined values and first to nth distances (n is a natural number larger than or equal to 2) are set and, when it is determined that each of the pieces of GPS accuracy information of GPS information included in a range of the mth distance (m is any one of 1 to n) from the latest GPS position is higher than or equal to the mth predetermined value, a GPS track included in the range of the mth distance is compared with a self-contained navigation track included in the range of the mth distance. As described above, when it is determined whether each of the pieces of GPS accuracy information is higher than or equal to a predetermined value within a predetermined distance, a distance for comparing the tracks is elongated when any one of the pieces of GPS accuracy information of GPS information is lower than the predetermined value. Furthermore, here, it is only necessary that a self-contained navigation track is compared with a GPS track in a distance that is reduced as the accuracy of GPS information indicated by GPS accuracy information increases, so it is applicable that a GPS track included in a range of a first distance from the latest GPS position is compared with a self-contained navigation track when the mean of the pieces of GPS accuracy information of GPS information included in the range of the first distance is higher than or equal to a predetermined value, and a GPS track included in a range of a second distance, which is longer than the first distance, is compared with a self-contained navigation track when the mean is not higher than or equal to the predetermined value.

Furthermore, the above described technique for comparing a time-series self-contained navigation track with a time-series GPS track to correct self-contained navigation information so as to reduce the difference therebetween may also be applied as a program or a method. In addition, the above described device, program and method may be implemented as a sole device or may be implemented by utilizing a component shared with various portions provided for a vehicle, and are implemented in various forms. For example, it is possible to provide a navigation system, a navigation method and a program that are provided with the device described in the above embodiment. In addition, the device described in the above embodiment may be modified where appropriate; for example, part of the device is software or part of the device is hardware. Furthermore, the aspect of the invention may be implemented as a storage medium storing a program that controls the device. Of course, the storage medium storing software may be a magnetic storage medium or may be a magnetooptical storage medium, and any storage media that will be developed in the future may also be used similarly.

What is claimed is:

1. A track information generating device comprising:
a self-contained navigation track acquisition unit that acquires a self-contained navigation track that is a track of a vehicle indicated by a plurality of time-series pieces of self-contained navigation information obtained from a speed sensor and a direction sensor on the vehicle;
a GPS track acquisition unit that acquires a GPS track that is a track of the vehicle indicated by a plurality of time-series pieces of GPS information obtained from a GPS sensor on the vehicle, each time-series pieces of GPS information including GPS accuracy information that indicates an accuracy of the piece of GPS information; and
a self-contained navigation information correcting unit that:
rotates and translates the self-contained navigation track to a location and orientation having the highest degree of coincidence between the self-contained navigation track and the GPS track;
determines a rotation angle for rotating the self-contained navigation track on the basis of a representative value of direction differences between directions of the vehicle, indicated by the pieces of self-contained navigation information at multiple time points, and directions of the vehicle, indicated by the pieces of GPS information at multiple time points;
determines the representative value of the direction differences on the basis of a frequency distribution of the direction differences, which is generated so that a frequency increases with an increase in the accuracy of the GPS information, indicated by the corresponding GPS accuracy information, and determines a representative value of the position differences on the basis of a frequency distribution of the position differences, which is generated so that a frequency increases with an increase in the accuracy of the GPS information, indicated bathe corresponding GPS accuracy information;
determines a translation amount for translating the self-contained navigation track on the basis of a representative value of position differences between positions of the vehicle, indicated by the pieces of self-contained navigation information at multiple time points, and positions of the vehicle, indicated by the pieces of GPS information at multiple time points;
sets a correction target of the self-contained navigation information on the basis of the rotated and translated the self-contained navigation track;
corrects the self-contained navigation information by reducing a difference between the correction target and the self-contained navigation information; and
compares the rotated and translated self-contained navigation track with the GPS track to correct the self-contained navigation information by reducing a difference between the self-contained navigation track and the GPS track.

2. The track information generating device according to claim 1, wherein
the self-contained navigation information correcting unit compares the self-contained navigation track with the GPS track in a distance that is reduced with an increase in the accuracies of the pieces of GPS information, indicated by the corresponding pieces of GPS accuracy information.

3. A track information generating method comprising:
acquiring, with a processor, a self-contained navigation track that is a track of a vehicle indicated by a plurality of time-series pieces of self-contained navigation information obtained from a speed sensor and a direction sensor on the vehicle;
acquiring, with the processor, a GPS track that is a track of the vehicle indicated by a plurality of time-series pieces of GPS information obtained from a GPS sensor on the vehicle, each time-series pieces of GPS information including GPS accuracy information that indicates an accuracy of the piece of GPS information;
rotating and translating, with the processor, the self-contained navigation track to a location and orientation having the highest degree of coincidence between the self-contained navigation track and the GPS track;
determining, with the processor, a rotation angle for rotating the self-contained navigation track on the basis of a representative value of direction differences between directions of the vehicle, indicated by the pieces of self-contained navigation information at multiple time points, and directions of the vehicle, indicated by the pieces of GPS information at multiple time points;

determining, with the processor, the representative value of the direction differences on the basis of a frequency distribution of the direction differences, which is generated so that a frequency increases with an increase in the accuracy of the GPS information, indicated by the corresponding GPS accuracy information, and determines a representative value of the position differences on the basis of a frequency distribution of the position differences, which is generated so that a frequency increases with an increase in the accuracy of the GPS information, indicated by the corresponding GPS accuracy information;

determining, with the processor, a translation amount for translating the self-contained navigation track on the basis of a representative value of position differences between positions of the vehicle, indicated by the pieces of self-contained navigation information at multiple time points, and positions of the vehicle, indicated by the pieces of GPS information at multiple time points;

setting, with the processor, a correction target of the self-contained navigation information on the basis of the rotated and translated the self-contained navigation track;

correcting, with the processor, the self-contained navigation information by reducing a difference between the correction target and the self-contained navigation information; and comparing, with the processor, the rotated and translated self-contained navigation track with the GPS track to correct the self-contained navigation information by reducing a difference between the self-contained navigation track and the GPS track.

4. A non-transitory computer-readable storage medium that stores computer-executable instructions for performing a track information generating method comprising:

acquiring a self-contained navigation track that is a track of a vehicle indicated by a plurality of time-series pieces of self-contained navigation information obtained from a speed sensor and a direction sensor on the vehicle;

acquiring a GPS track that is a track of the vehicle indicated by a plurality of time-series pieces of GPS information obtained from a GPS sensor on the vehicle;

rotating and translating the self-contained navigation track to a location and orientation having the highest degree of coincidence between the self-contained navigation track and the GPS track;

determining a rotation angle for rotating the self-contained navigation track on the basis of a representative value of direction differences between directions of the vehicle, indicated by the pieces of self-contained navigation information at multiple time points, and directions of the vehicle, indicated by the pieces of GPS information at multiple timepoints;

determining the representative value of the direction differences on the basis of a frequency distribution of the direction differences, which is generated so that a frequency increases with an increase in the accuracy of the GPS information, indicated by the corresponding GPS accuracy information, and determines a representative value of the position differences on the basis of a frequency distribution of the position differences, which is generated so that a frequency increases with an increase in the accuracy of the GPS information, indicated by the corresponding GPS accuracy information;

determining a translation amount for translating the self-contained navigation track on the basis of a representative value of position differences between positions of the vehicle, indicated by the pieces of self-contained navigation information at multiple time points, and positions of the vehicle, indicated by the pieces of GPS information at multiple time points;

setting a correction target of the self-contained navigation information on the basis of the rotated and translated the self-contained navigation track;

correcting the self-contained navigation information by reducing a difference between the correction target and the self-contained navigation information; and comparing the rotated and translated self-contained navigation track with the GPS track to correct the self-contained navigation information by reducing a difference between the self-contained navigation track and the GPS track.

* * * * *